(12) United States Patent
Sjöberg et al.

(10) Patent No.: US 9,565,434 B2
(45) Date of Patent: Feb. 7, 2017

(54) REFERENCE PICTURE LIST HANDLING

(71) Applicant: Telefonaktiebolaget L M Ericsson (publ), Stockholm (SE)

(72) Inventors: Rickard Sjöberg, Stockholm (SE); Jonatan Samuelsson, Stockholm (SE); Per Wennersten, Årsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 287 days.

(21) Appl. No.: 14/372,704

(22) PCT Filed: Jan. 14, 2013

(86) PCT No.: PCT/SE2013/050017
§ 371 (c)(1),
(2) Date: Jul. 16, 2014

(87) PCT Pub. No.: WO2013/109183
PCT Pub. Date: Jul. 25, 2013

(65) Prior Publication Data
US 2015/0016505 A1    Jan. 15, 2015

Related U.S. Application Data

(60) Provisional application No. 61/587,304, filed on Jan. 17, 2012, provisional application No. 61/588,735, filed on Jan. 20, 2012.

(51) Int. Cl.
*H04N 7/12* (2006.01)
*H04N 11/02* (2006.01)
*H04N 11/04* (2006.01)
*H04N 19/70* (2014.01)
*H04N 19/46* (2014.01)
*H04N 19/51* (2014.01)
*H04N 19/174* (2014.01)

(52) U.S. Cl.
CPC ........ *H04N 19/00884* (2013.01); *H04N 19/46* (2014.11); *H04N 19/70* (2014.11); *H04N 19/174* (2014.11); *H04N 19/51* (2014.11)

(58) Field of Classification Search
CPC .. H04N 19/00884; H04N 19/46; H04N 19/70; H04N 19/174; H04N 19/51
USPC ..................................... 375/240.02
See application file for complete search history.

(56) References Cited

U.S. PATENT DOCUMENTS

| | | | |
|---|---|---|---|
| 2010/0316362 A1* | 12/2010 | Jeon | H04N 19/597 386/355 |
| 2012/0189053 A1* | 7/2012 | Chen | H04N 19/105 375/240.12 |

OTHER PUBLICATIONS

International Search Report for PCT Application No. PCT/SE2013/050017 mailed Aug. 2, 2013, 3 pages.

(Continued)

*Primary Examiner* — Andy Rao
*Assistant Examiner* — Jared Walker
(74) *Attorney, Agent, or Firm* — Myers Bigel, P.A.

(57) ABSTRACT

At least one mode signaling syntax element is provided based on an encoded representation of a picture in a video sequence. The at least one mode signaling syntax element is employed to determine whether at least one final reference picture list is the same for all slices of a same slice type in the picture. The at least one mode signaling syntax element thereby signals to a decoder that it does not necessarily have to repeat computationally complex reference picture list construction functions for each slice in the picture.

17 Claims, 11 Drawing Sheets

(56) References Cited

OTHER PUBLICATIONS

Written Opinion of the International Preliminary Examining Authority for PCT Application No. PCT/SE2013/050017 mailed Aug. 2, 2013, 7 pages.
International Preliminary Report on Patentability for PCT Application No. PCT/SE2013/050017 mailed Jan. 14, 2014, 13 pages.
Sjöberg R et al: "AHG21: Reference picture list restrictions", 99. MPEG Meeting; Feb. 6, 2012-Feb. 10, 2012; San Josa CR; (Motion Picture Expert Group or ISO/IEC JTC1/SC29/WG11), No. m23288, Feb. 5, 2012 XP030051813, 37 pages.
Flynn et al: "JCT-VC AHG report: Reference picture buffering and list construction (AHG21)", 7. JCT-VC Meeting; 98 MPEG Meeting; Nov. 21, 2011-Nov. 30, 2011; Geneva; (Joint Collaborative Team on Video Coding of ISO/IEC JTC1/SC29/WG11 and ITU-T SG.16); URL: http://wftp3.itu.int/av-arch/jctvc-site/, No. JCTVC-G021, Nov. 21, 2011 XP030110020, 9 pages.
Sjöberg R et al: "Absolute signaling of reference pictures", 6. JCT-VC Meeting; 97. MPEG Meeting; Jul. 14, 2011-Jul. 22, 2011; Torino; (Joint Collaborative Team on Video Coding of ISO/IEC JTC1/SC29/WG11 and ITU-T SG.16); URL: http://wftp3.itu.int/av-arch/jctvc-site/, No. JCTVC-F493, Jul. 22, 2011 XP030009516, 10 pages.
Boyce J et al: "BoG report on Reference picture buffering and list construction" 7. JCT-VC Meeting; 98. MPEG Meeting; Nov. 21, 2011-Nov. 30, 2011; Geneva; (Joint Collaborative Team on Video Coding of ISO/IEC JTC1/SC29/WG11 and ITU-T SG.16); URL: http://wftp3.itu.int/av-arch/jctvc-site/, No. JCTVC-G1002, Nov. 23, 2011 XP030110986, 8 pages.
Notice of Reasons for Rejection with English language translation, JP Application No. 2014-552155, Feb. 9, 2016.
Communication with European Search Report, EP Application No. 15193091.4, Apr. 5, 2016.
Wahadaniah et al., "AHG21: Construction and modification of predefined reference picture sets and reference picture sets", Joint Collaborative Team on Video Coding (JCT-VC) of ITU-T SG16 WP3 and ISO/IEC JTC1/SC29/WG11, Document: JCTVC-G548, 7th Meeting: Geneva, CH, Nov. 21-30, 2011, 21 pp.

* cited by examiner

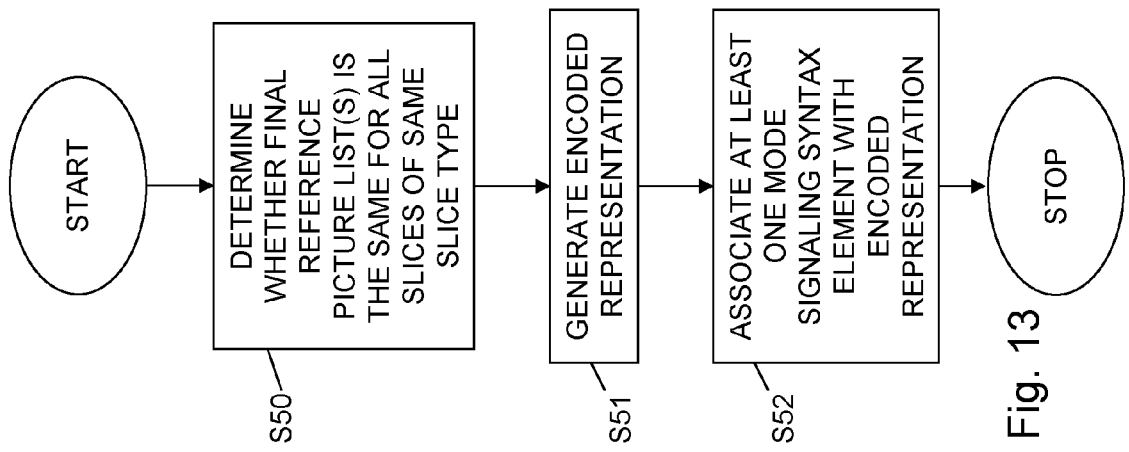
Fig. 13
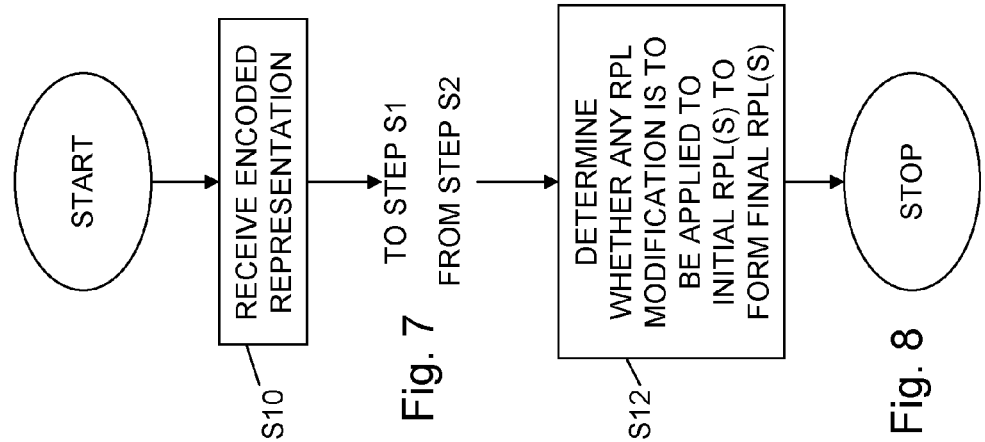
Fig. 7
Fig. 8
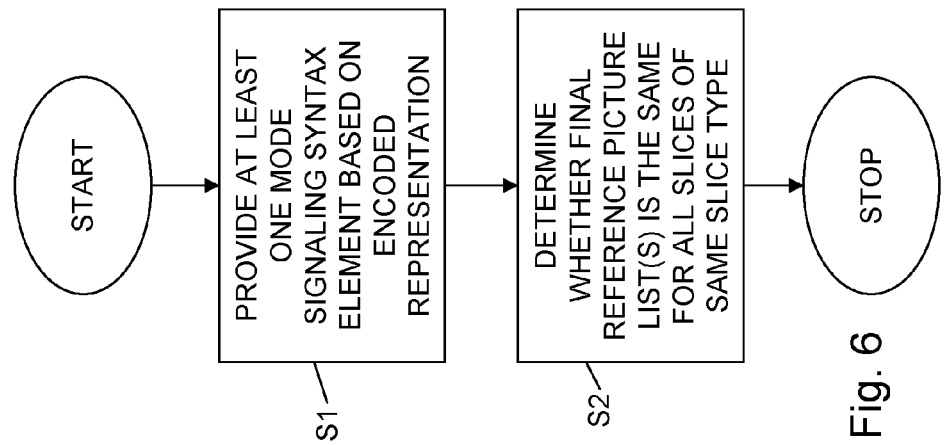
Fig. 6

REFERENCE PICTURE LIST HANDLING

CROSS REFERENCE TO RELATED APPLICATION

This application is a 35 U.S.C. §371 national stage application of PCT International Application No. PCT/SE2013/050017, filed on 14 Jan. 2013, which itself claims the benefit of both U.S. provisional Patent Application No. 61/587,304, filed 17 Jan. 2012, and U.S. provisional Patent Application No. 61/588,735, filed 20 Jan. 2012, the disclosures and contents of which are incorporated by reference herein in their entirety. The above-referenced PCT International Application was published in the English language as International Publication No. WO 2013/109183 A2 on 25 Jul. 2013.

TECHNICAL FIELD

The present embodiments generally relate to video encoding and decoding, and in particular to reference picture handling in such video encoding and decoding.

BACKGROUND

High Efficiency Video Coding (HEVC) is a new video coding standard currently being developed in Joint Collaborative Team-Video Coding (JCT-VC). JCT-VC is a collaborative project between Moving Picture Experts Group (MPEG) and International Telecommunication Union-Telecommunication Strandardization Sector (ITU-T). Currently, an HEVC Model (HM) is defined that includes a number of new tools and is considerably more efficient than H.264/Advanced Video Coding (AVC).

A picture in HEVC is partitioned into one or more slices, where each slice is an independently decodable segment of the picture. This means that if a slice is missing, for instance got lost during transmission, the other slices of that picture can still be decoded correctly. In order to make slices independent, they do not depend on each other. No bitstream element of another slice is required for decoding any element of a given slice.

Each slice contains a slice header which independently provides all required data for the slice to be independently decodable. One example of a data element present in the slice header is the slice address, which is used for the decoder to know the spatial location of the slice. Another example is the slice quantization delta which is used by the decoder to know what quantization parameter to use for the start of the slice. There are many more data elements in the slice header.

HEVC also has mechanisms for handling reference pictures, which are previously decoded pictures to be used for decoding a current picture. The reference pictures are included in reference picture lists, which for HEVC is similar to the reference picture list in H.264.

In the draft HEVC specification three types of slices are defined:
- I slices, also referred to as slice type 2, which does not use inter prediction and does not have any reference picture lists;
- P slices, also referred to as slice type 0, which has only one reference picture list L0; and
- B slices, also referred to as slice type 1, which has three reference picture lists L0, L1 and LC.

In H.264, the reference picture lists L0 and L1 are first initialized. Then there is an optional modification process that is controlled by bitstream syntax elements that are present in the bitstream.

It has been proposed that HEVC should have three reference picture lists that are initialized similarly to H.264. They are called L0, L1 and LC. Also here there are syntax elements to modify the reference picture lists. The reference picture lists are then used in the decoding process of the current slice in the current picture.

For both H.264 and HEVC there is the possibility to modify the reference picture lists independently for each slice. That is done by indicating how the reference picture lists should be modified according to a specified syntax. One slice may for instance use the initialized reference picture lists without modification while for another slice there are syntax elements present that change the reference picture lists of the slice and make them different to the initialized reference picture lists.

The decoding process to generate final reference picture lists is as follows:
1. The decoder constructs initial reference picture lists. This is also referred to as the decoder initializes the reference picture lists.
2. The decoder checks whether optional list modification syntax elements are present in the bitstream. This is done by checking the values of list modification flags that are present in the bitstream.
3. If there are no list modification syntax elements present according to step 2, the initial reference picture lists from step 1 are used in the decoding process of the current slice. If there are list modification syntax elements according to step 2, the decoder decodes list modification syntax elements and performs list modification operations on the initial reference picture lists from step 1. These modified reference picture lists are then used in the decoding process of the current slice.

A problem with the prior art technique is that the reference picture handling implies complex hardware decoder designs in order to be able to provide full flexibility of slices and handle the list initialization and modification processes. A hardware decoder will typically run the list construction on a slow processor and not with dedicated hardware. If an encoded picture is split into a high number of slices and modifications are used for the slices, the decoding complexity of list construction will be significant.

SUMMARY

It is a general objective to provide an efficient encoding and decoding of pictures in a video sequence.

It is a particular objective to provide an efficient reference picture list handling in connection with such encoding and decoding of pictures.

These and other objectives are met by embodiments disclosed herein.

An aspect of the embodiments relates to a method of reference picture list handling in connection with decoding an encoded representation of a picture in a video sequence. The picture comprises multiple slices. The method comprises providing at least one mode signaling syntax element based on the encoded representation The method also comprises determining, based on the at least one mode signaling syntax element, whether final reference picture list or lists is or are the same for all slices of a same slice type in the picture.

A related aspect of the embodiments defines a device for reference picture handling. The device comprises a syntax element provider configured to provide at least one mode signaling syntax element based on an encoded representation of a picture in a video sequence. The picture comprises multiple slices. The device also comprises a list determiner configured to determine, based on the at least one mode signaling syntax element, whether final reference picture list or lists is or are the same for all slices of a same slice type in the picture.

Other related aspects of the embodiments define i) a decoder comprising a device for reference picture list handling and ii) a receiver comprising an input unit configured to receive an encoded representation of a picture of a video sequence. The picture comprises multiple slices. The receiver further comprising a decoder according to the embodiments, a reference picture buffer configured to store reference pictures and an output unit configured to output a decoded picture.

Another aspect of the embodiments relates to a method of encoding a picture comprising multiple slices and present in a video sequence. The method comprises determining whether final reference picture list or lists is or are the same for all slices of a same slice type in the picture. An encoded representation of the picture is generated. At least one mode signaling syntax element indicative of whether final reference picture list or lists is or are the same for all slices of the same slice type in the picture is associated with the encoded representation.

Another related aspect of the embodiments defines an encoder for encoding a picture comprising multiple slices of a video sequence. The encoder comprises a list determiner configured to determine whether final reference picture list or lists is or are the same for all slices of a same slice type in the picture. A representation generator is configured to generate an encoded representation of the picture. The encoder also comprises a syntax element associating unit configured to associate at least one mode signaling syntax element indicative of whether final reference picture list or lists is or are the same for all slices of the same slice type in the picture with the encoded representation.

A further related aspect of the embodiments defines a transmitter comprising an input unit configured to receive a picture of a video sequence. The picture comprises multiple slices. The transmitter also comprises an encoder according to the embodiments and an output unit configured to output an encoded representation of the picture.

The embodiments thereby signal in the bitstream, i.e. coded data of the video sequence, whether slices of a same slice type in the picture have identical reference picture list(s). This in turn means that the decoder can use the signaled information to decide whether the computationally complex reference picture list construction could be performed only once for the slices of the picture and therefore do not need to be repeated for these slices.

The embodiments thereby reduce computation complexity in connection with picture decoding but still enable full flexibility of slices.

BRIEF DESCRIPTION OF THE DRAWINGS

The invention, together with further objects and advantages thereof, may best be understood by making reference to the following description taken together with the accompanying drawings, in which:

FIG. 6 is a flow diagram of a method of reference picture handling according to an embodiment;

FIG. 7 is a flow diagram of an additional, optional step of the method in FIG. 6;

FIG. 8 is a flow diagram of an additional, optional step of the method in FIG. 6;

FIG. 13 is a flow diagram of a method for encoding a picture according to an embodiment;

DETAILED DESCRIPTION

Throughout the drawings, the same reference numbers are used for similar or corresponding elements.

The present embodiments generally relate to video encoding and decoding, and in particular to reference picture handling in video encoding and decoding.

In video encoding and decoding it is generally preferred to have full flexibility in the encoding and decoding of slices in pictures of a video sequence. However, such flexibility comes at a cost of high complexity and tedious processing during decoding of slices. For instance, if a picture is split into a high number of slices, a reference picture list initialization process must be invoked many times in the decoder, actually once for each such slice. This is true even if the reference picture lists would be the same in each list and any list modification syntax is repeated for the slices. Thus, since the decoder does not know that they are the same it has to execute the full reference picture list initialization and modification process for each slice anyway.

The present embodiments solve this and other problems in connection with video encoding and decoding by enabling signaling whether a final reference picture list is or final reference pictures lists are the same for all slices of a same slice type in the same picture. This in turn implies that the decoding complexity can be reduced.

Hence, it is proposed to signal in the bitstream, i.e. the encoded data from an encoder to a decoder, at least one mode signaling syntax element that informs the decoder whether the final reference picture lists(s) obtained following list construction, i.e. the reference picture list(s) obtained following list initialization and optional list modification, will be the same, i.e. identical, for all slices of the same slice type in the picture. In particular, embodiments can be used to indicate that reference picture list construction could be performed once for all slices of the same slice type in the picture.

Thus, the embodiments make it possible to signal in the bitstream to the decoder that all slices of a same slice type in the picture will have identical final reference picture list(s). In this way the decoder does not have to repeat computationally complex reference picture list construction functions for each slice. Instead the decoder can perform the list construction only once per picture regardless of how many slices there are for the particular picture.

Figure 3:
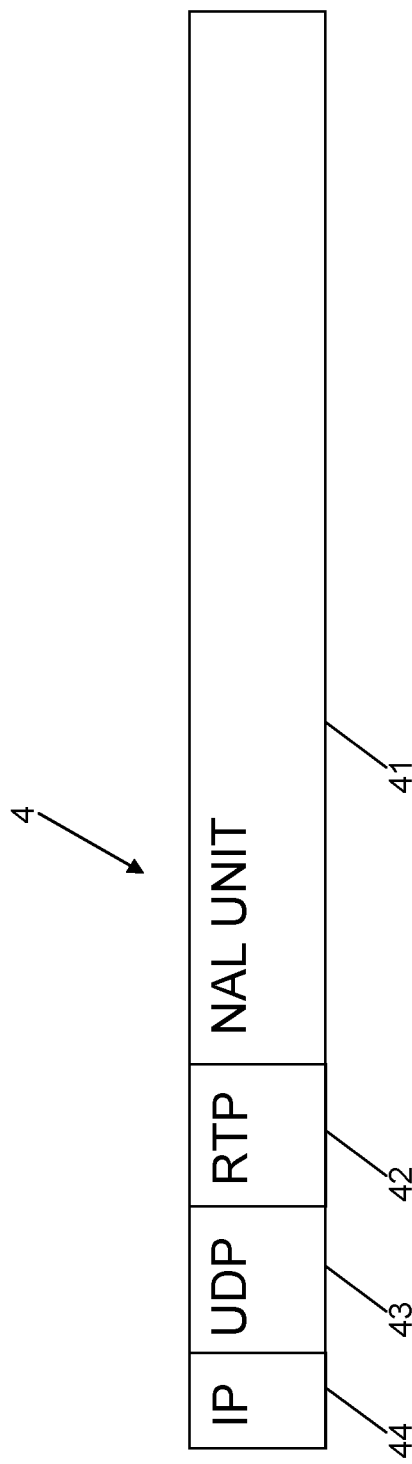
FIG. 3 schematically illustrates an example of a portion of a coded video sequence.

Generally, a coded video sequence comprises Network Abstraction Layer (NAL) units 41 as illustrated in FIG. 3. Basically a NAL unit 41 comprises a slice with a corresponding slice header, including control information for that slice, and encoded slice data. Alternatively, the NAL unit 41 comprises, for instance, a parameter set with control information. Other types of NAL units 41 are also available.

A NAL unit 41 as output from an encoder is typically complemented with headers 42-44 to form a data packet 4 that can be transmitted as a part of a bistream from the encoder to the decoder. For instance, Real-time Transport Protocol (RTP) 42, User Datagram Protocol (UDP) 43 and Internet Protocol (IP) 44 headers could be added to the NAL unit 41. This form of packetization of NAL units 41 merely constitutes an example in connection with video transport. Other approaches of handling NAL units 41, such as file format, MPEG-2 transport streams, MPEG-2 program streams, etc. are possible.

Examples of parameter sets that could be carried in NAL units 41 include Adaptation Parameter Set (APS), Picture Parameter Set (PPS), Sequence Parameter Set (SPS) and Video Parameter Set (VPS). APS comprises control information valid for more than one slice. The control information may differ between the slices. PPS comprises control information valid for several pictures, and may be the same for multiple pictures of the same video sequence. SPS comprises control information valid for an entire video sequence.

A parameter set that is applicable to a given slice in a picture is typically identified based on information present in the encoded representation of the slice, typically in the slice header of the encoded representation. The information is typically in the form of a parameter set identifier either directly identifying the parameter set or identifying another parameter set that comprises an identifier identifying the parameter set. For instance, an APS or a PPS is identified by an APS or a PPS identifier present in the slice header; an SPS is identified by an SPS identifier present in a PPS identified by a PPS identifier present in the slice header and a VPS is identified by a VPS identifier present in an SPS identified by an SPS identifier present in a PPS identified by a PPS identifier present in the slice header.

The NAL units 41, such as shown in FIG. 3, typically arrive at the decoder according to a decoding order and any parameter set to be used when decoding the slice data has to be available at the decoder. The decoder knows when a parameter set is to be used since there is a reference link, i.e. parameter set identifier, in the slice header to the valid parameter set.

FIG. 6 is a flow diagram illustrating a method of reference picture list handling in connection with decoding an encoded representation of a picture in a video sequence according to an embodiment. In this embodiment the picture has preferably, in connection with encoding, been divided or split into multiple, i.e. at least two, slices. Hence, the picture preferably comprises multiple slices. The method preferably comprises providing, in step S1, at least one mode signaling syntax element based on the encoded representation. A next step S2 comprises determining, based on the at least one mode signaling syntax element, whether a final reference picture list is or final reference picture lists are the same for all slices of a same slice type in the picture.

The at least one syntax element provided in step S1 is used in step S2 to determine whether the at least one final reference picture list is the same for all slices of the same slice type in the picture. In a particular embodiment step S2 comprises analyzing a respective value of the at least one mode signaling syntax element and performing the determination whether the final reference picture list or list is or are the same for all slices of the same slice type in the picture based on the respective value of the at least one mode signaling syntax element.

Thus, a decoder may determine or decide based on the at least syntax element that the final reference picture list(s) will be identical for all slices of the same slice type in the picture. In such a case, the at least one final reference picture list can be generated in a list construction for a first slice of the picture when the decoder receives and decodes the encoded representation of this first slice. The generated at least one final reference picture list could then be reused for other, subsequently received and decoded, slices of the picture without the need for performing any new list construction, i.e. list initialization and optionally a list modification.

The encoded representation of the picture preferably corresponds to at least one respective encoded representation of a slice, such as in the form of at least one NAL unit, with a respective slice header and slice data generated by an encoder for the picture.

The at least one mode signaling syntax element provided in step S1 could, for instance, be sent in the slice header of an encoded representation of a slice of the picture. In such a case, the at least one mode signaling syntax element could be inserted into the slice header of the first slice of the picture. However, in order to provide robustness, for instance if the data packet carrying the encoded representation of the first slice got lost, the at least one mode signaling syntax element is preferably inserted, in an embodiment, into the slice header of each encoded representation of a slice in the picture, i.e. for each slice of the picture.

In alternative embodiment, the at least one mode signaling syntax element could be sent in a parameter set associated with and identifiable based on the encoded representation of the picture. In such a case, the encoded representation comprises, preferably in a slice header, a parameter set identifier enabling identification of the relevant parameter set that comprises the at least one mode signaling syntax element. In an embodiment, the slice header could include a parameter set identifier, such as an APS identifier or a PPS identifier, identifying the relevant parameter set, such as an APS or an PPS, that comprises the at least one mode signaling syntax element. Alternatively, the slice header could comprise a first parameter set identifier, such as a PPS identifier, that identifies a first parameter set, such a PPS, which in turn comprises a second parameter set identifier, such as an SPS identifier, that identifies a second parameter set, such as an SPS, that comprises the at least one mode signaling syntax element or that comprises a third parameter set identifier, such as a VPS identifier, that identifies a third parameter set, such as a VPS, that comprises the at least one mode signaling syntax element.

It is also possible to signal the at least one mode signaling syntax element elsewhere in the bitstream from the encoder to the decoder or in various messages or data structures associated with the bitstream. For instance, the information could be provided as part of Video Usability Information (VUI) and/or Supplemental Enhancement Information (SEI).

The at least one mode signaling syntax element as provided in step S1 could be in the form of a single mode signaling syntax element or multiple mode signaling syntax elements. In the latter case, these multiple mode signaling syntax elements could be provided together in the slice header, in the same parameter set or the same other data structure or message. It is also possible to distribute the multiple mode signaling syntax elements so that a first mode signaling syntax element is found in a slice header and a second mode signaling syntax element is found in a parameter set, VUI or SEI. Alternatively, a first mode signaling syntax element is found in a first parameter set and a second mode signaling syntax element is found in a second parameter set, VUI or SEI. This concept can be extended to the case with more than two mode signaling syntax elements.

A syntax element as used herein is a codeword or data element forming part of the encoded data generated by an encoder and to be decoded by a decoder. Hence, a syntax element is typically a codeword or data element, including a flag, forming part of the control data associated with an encoded representation or such control data or header data present in an encoded representation of a picture. A syntax element can, for instance, be a codeword in a slice header of the encoded representation of a picture. Alternatively, a syntax element can, for instance, be a codeword in a parameter set or other control data associated with the encoded representation of a picture, e.g. retrievable from the bitstream based on data present in the encoded representation or sent outside of the bitstream but retrievable based on data present in the encoded representation.

Slices are, as is well known in the art, of different slice types depending on how the data, i.e. pixel data, of the slice is encoded. There are generally three types of slices. An I slice or slice type 2 does not use any inter prediction and therefore does not have any reference picture lists. The other two types of slices are denoted P slices or slice type 0 and B slice or slice type 1. Both these slice types use inter prediction and reference picture lists. P slices use a single reference picture list, generally denoted L0, whereas B slice use at least two reference picture lists, generally denoted L0 and L1.

Slice type as used herein preferably relates to an inter predicted slice type having a single prediction direction, i.e. slice type P or 0, or having dual, i.e. two, prediction directions, i.e. slice type B or 1.

In an embodiment step S2 in FIG. 6 comprises determining, based on the at least one mode signaling syntax element, whether a final reference picture list, i.e. L0, is the same for all P slices in the picture and final reference picture lists, i.e. L0 and L1, are the same for all B slices in the picture. This then means that all P slices in the picture will have the same L0 list and all B slices in the picture will have the same L0 and L1 lists.

In a particular embodiment the picture only comprises slices of the same slice type, i.e. all the slices of the picture are P slices or all slices of the picture are B slices. In the former case, step S2 comprises determining, based on the at least one mode signaling syntax element, whether a final reference picture list, L0, is the same for all slices in the picture. In the latter case, step S2 comprises determining, based on the at least one mode signaling syntax element, whether final reference picture lists, L0 and L1, are the same for all slices in the picture.

The embodiments are also applicable to pictures which could comprise both P slices and B slices. In such a case, the determination in step S2 could be performed separately for the P slices and the B slices. Thus, all P slices in the picture have the same final reference picture list L0 that could be different from the final reference picture list L0 of the B slices in the picture. The B slices, though, all have the same final reference picture list L0 and also the same final reference picture list L1.

In a particular embodiment, all the P slices and all the B slices of the picture could have the same final reference picture list L0 as indicated by the at least one mode signaling syntax element. In such a case, step S2 preferably comprises determining, based on the at least one mode signaling syntax element, whether a final reference picture list L0 is the same for all P slices and all B slices in the picture and a final reference picture list L1 is the same for all B slices in the picture.

The at least one mode signaling element typically indicates a list construction mode to be used in the list construction for the slices in the picture. Thus, the at least one mode syntax element preferably indicates which out of multiple such list construction modes that applies to the slices of the picture. For instance, a first such list construction mode involves that the final reference picture list(s) is(are) the same for all slices of the same slice type in the picture. A second list construction mode could then involve that the final reference picture list(s) do(es) not need to be the same for all slices of the same slice type in the picture. In this latter case there is therefore no restriction on the number of different final reference picture lists that can be used for the picture. Hence, there may be as many final reference picture lists or pairs of final reference picture lists as there are slices in the picture.

In an embodiment step S2 therefore comprises determining, based on the at least one mode signaling syntax element, whether i) the final reference picture list(s) is(are) the same for all slices of the same slice type in the picture or ii) the number of different reference picture lists used in the picture is unrestricted.

The at least one mode signaling syntax element may, in a particular embodiment, be used to determine whether reference picture list construction can be performed once for all the slices of the picture that are of the same slice type.

For instance, it could be determined, in step S2, whether all P slices or all B slices of a picture could use the same reference picture list construction based on the at least one mode signaling syntax element provided in step S1. In such a case, reference picture list construction only needs to be performed once for all the P slices or B slices of the relevant picture.

This means that the at least one mode signaling syntax element provided based on the encoded representation in step S1 can be used by the decoder to determine whether a single reference picture list construction could be performed for all the slices of the picture that are of a same slice type. This in turn implies that it is possible for the decoder to reuse the at least one reference picture list constructed for a first slice of the picture during the decoding of any following slice(s) of the picture, preferably of any following slice(s) of the picture that is(are) of a same slice type.

Reference picture list construction involves, which is known in the art, constructing at least one reference picture list, denoted final reference picture list herein, for a slice to be decoded. This at least one final reference picture list comprises information, such as picture identifiers, e.g. in the form of picture order counts (POCs), of at least one previously decoded picture of the video sequence that can be used as decoding basis for the current picture and/or for following, according to a decoding order, pictures of the video sequence. The reference picture list construction could, for instance, generate one reference picture list, such as for P slices, or multiple, such as two, reference picture lists, such as for B slices.

The reference picture list construction typically involves a reference picture initialization that generates at least one initial reference picture list based on control information provided in the bitstream of the video sequence. The control information could, for instance, include the picture identifiers of the reference pictures of the at least one initial reference picture list or information enabling calculation of these picture identifiers.

This at least one initial reference picture list could be used, during decoding of a slice, as the at least one final reference picture list. In such a case, the reference picture list construction basically only comprises the reference picture list initialization.

However, it could be possible that the bitstream comprises optional list modification syntax. In such a case, the decoder checks the value(s) of such list modification syntax element(s), typically in the form of list modification presence flag(s), and performs list modification operations on the at least one initial reference picture list based on the list modification syntax element(s) to get at least one modified reference picture list to be used as the at least one final reference picture list when decoding the slice.

An example of reference picture list modification syntax could be as defined below:

| ref_pic_list_modification( ) { | Descriptor |
|---|---|
| if( slice_type != 2 ) { | |
|   ref_pic_list_modification_flag_l0 | u(1) |
|   if( ref_pic_list_modification_flag_l0 ) | |
|     do { | |
|       list_modification_idc | ue(v) |
|       if( list_modification_idc != 3 ) | |
|         ref_pic_set_idx | |
|     } while( list_modification_idc !=3 ) | |
| } | |
| if( slice_type == 1 ) { | |
|   ref_pic_list_modification_flag_l1 | u(1) |
|   if( ref_pic_list_modification_flag_l1 ) | |
|     do { | |
|       list_modification_idc | ue(v) |
|       if( list_modification_idc != 3 ) | |
|         ref_pic_set_idx | |
|     } while( list_modification_idc !=3 ) | |
| } | |
| } | |

In an embodiment the range of list_modification_idc could be 0 to 3, inclusive, and the different codewords correspond to different list modifications. An example of such list modifications could be as defined in Table 1 below.

TABLE 1 list modifications

| list_modification_idc | List modification |
|---|---|
| 0 | For list 0: ref_pic_set_idx is present and corresponds to an index to RefPicSetStCurr0<br>For list 1: ref_pic_set_idx is present and corresponds to an index to RefPicSetStCurr1 |
| 1 | For list 0: ref_pic_set_idx is present and corresponds to an index to RefPicSetStCurr1 |

TABLE 1-continued list modifications

| list_modification_idc | List modification |
|---|---|
| | For list 1: ref_pic_set_idx is present and corresponds to an index to RefPicSetStCurr0 |
| 2 | Ref_pic_set_idx is present and corresponds to RefPicSetLtCurr |
| 3 | End loop for modification of the initial reference picture list |

The above presented reference picture list modification syntax and list modification should merely be seen as illustrative but non-limiting examples of picture list modification operations that could be performed during the reference picture list construction.

The present embodiments are particularly suitable if the picture in the video sequence comprises multiple, i.e. at least two, slices. It is possible that the video sequence comprises some pictures that only comprise a respective slice and some pictures that comprise multiple slices. The embodiments are however also applicable to cases where the video sequence comprises pictures with only a single picture. This is particularly advantageous since the decoder generally does not know on beforehand that there will only be one slice per picture. The embodiments therefore provide at least one mode signaling syntax element, which informs the decoder that if at least one additional slice of the picture is to be received they will share at least one slice element that is kept the same.

FIG. 7 is a flow diagram illustrating an additional, optional step S10 of the method in FIG. 6. The method starts in step S10 where an encoded representation of a picture is received, such as in the form of one or more data packets comprising NAL unit(s) with encoded representation(s) of slice(s) of the picture. The method then continues to step S1 of FIG. 6, where the at least one syntax element is provided based on the received encoded representation.

FIG. 8 is a flow diagram illustrating an additional, optional step S12 of the method in FIG. 7. The method typically continues from step S2 in FIG. 6. Step S12 then comprises determining, based on the at least one mode signaling syntax element, whether any reference picture list modification is applied to an initial reference picture list or initial reference picture lists to form the final reference picture list or the final reference picture lists. The method then ends.

In this embodiment, the at least one mode signaling syntax element is therefore also employed to signal whether the list construction comprises, preferably only comprises, list initialization or comprises both list initialization and list modification. Thus, the at least one mode signaling syntax element is indicative of whether the initial reference picture list(s) obtained from the list initialization is(are) to be used as the final reference picture list(s) or whether reference picture list modification is to be applied to the initial reference picture list(s) to form modified reference picture list(s) that is(are) used as the final reference picture list(s).

The at least one mode signaling syntax element preferably comprises, in this embodiment, a first mode signaling syntax element indicative of whether final reference picture list(s) is(are) the same for all slices of the same slice type in the picture and a second mode signaling syntax element indicative of whether any reference picture list modification is applied to initial reference picture list(s) to form the final reference picture list(s). These embodiments will now be further discussed below with reference to FIGS. 9-11.

Figure 9:
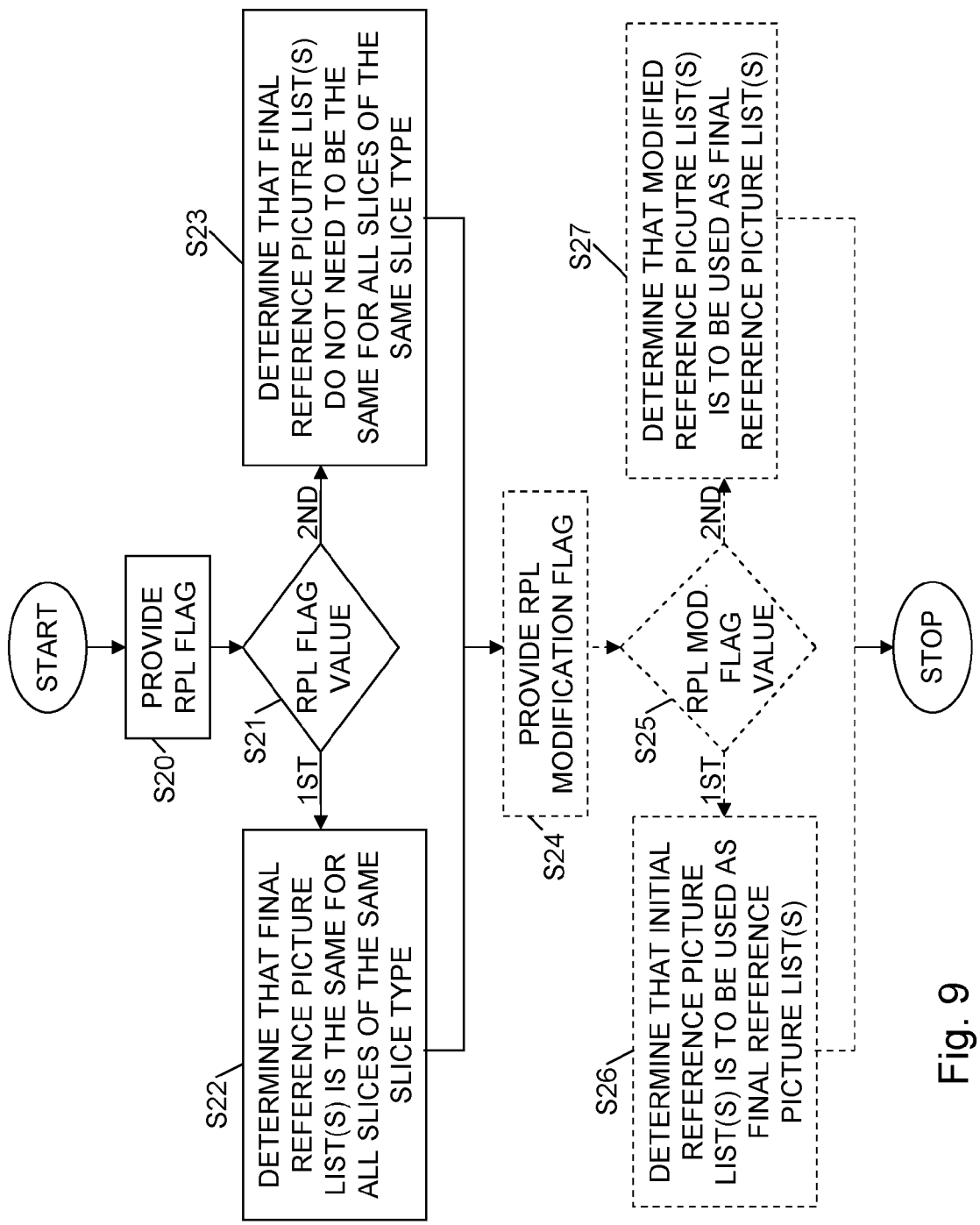
FIG. 9 is a flow diagram of a method of reference picture handling according to another embodiment.

FIG. 9 is a flow diagram illustrating various embodiments of the method of reference picture list handling. The method generally starts in step S20 where a reference picture list (RPL) flag is provided as a first mode signaling syntax element based on the encoded representation of the picture. This RPL flag could, for instance, be retrieved from a parameter set, such as SPS, or other control information, such as VUI, associated with the encoded representation.

In a next step S21 the value of the RPL flag provided in step S20 is investigated. If the RPL flag has a first value, such as $1_{bin}$ (or $0_{bin}$), the method continues to step S22. Step S22 comprises determining that the final reference picture list(s) is(are) the same for all slices of the same slice type in the picture.

However, if the RPL flag instead has a second value, such as $0_{bin}$ (or $1_{bin}$), the method instead continues to step S23. Step S23 comprises determining that the final reference picture list(s) do(es) not need to be the same for all slices of the same slice type in the picture.

Thus, in this embodiment the at least one mode signaling syntax element is or at least comprises a RPL flag, i.e. an 1-bit syntax element. The RPL flag can thereby signal one out of two possible list construction modes, i.e. that the final reference picture list(s) is(are) the same or do not need to be the same for all the slices in the picture.

The method could then end. In an alternative embodiment the method continues to step S24. This step S24 comprises providing a RPL modification flag as a second mode signaling syntax element based on the encoded representation. This RPL modification flag could, for instance, be retrieved from a parameter set, such as SPS or PPS, identified based on a parameter set identifier, such as PPS identifier, retrieved from the slice header or based on a parameter set identifier, such as SPS identifier, retrieved from another parameter set, such as PPS, identified based another parameter set identifier, such as PPS identifier, retrieved from the slice header.

In a next step S25 the value of this RPL modification flag is checked. If the RPL modification flag has a first value, such as $1_{bin}$ (or $0_{bin}$), the method continues to step S26. Step S26 comprises determining that at least one initial reference picture list obtained in a reference picture list initialization is to be used as the at least one final reference picture list. Thus, in this case no list modifications are to be applied to the at least one initial reference picture list. If the RPL flag had the first value as determined in step S21 this step S26 thereby comprises determining that the at least one initial reference picture list obtained in the reference picture list initialization is to be used as the at least one final reference picture list for all slices of the same slice type in the picture. If step S21 instead determined that the RPL flag had the second value this step S26 comprises determining that the at least one initial reference picture list obtained for the current slice of the picture is to be used as the at least one final reference picture list for the current slice.

If the RPL modification flag provided in step S24 instead has a second value, such as $0_{bin}$ (or $1_{bin}$), as determined in step S25 the method continues to step S27. This step S27 then comprises determining that at least one modified reference picture list obtained by modifying at least one initial reference picture list obtained in a reference picture list initialization is to be used as the at least one final reference picture list. Thus, in this case list modification or modifications will be applied to the at least one initial reference picture list.

If the RPL flag had the first value as determined in step S21 this step S27 thereby comprises determining that the at least modified reference picture list obtained by modifying the at least one initial reference picture list obtained in the reference picture list initialization is to be used as the at least one final reference picture list for all slices of the same slice type in the picture. If step S21 instead determined that the RPL flag had the second value this step S27 comprises determining that the at least one initial reference picture list obtained for the current slice of the picture is to be modified in a list modification to obtain at least one modified reference picture list, which used as the at least one final reference picture list for the current slice.

Steps S24, S25 and S26 or steps S24, S25 and S27 need only be performed once for all slices of the same slice type, preferably one for all slices of the picture, if step S21 involved determining that the RPL flag had the first value and the method continued to step S22. However, if step S21 instead involved determining that the RPL flag had the second value and the method continued to step S23 steps S24, S25 and S26 or S27 are preferably performed once for each slice in the picture.

Figure 10:
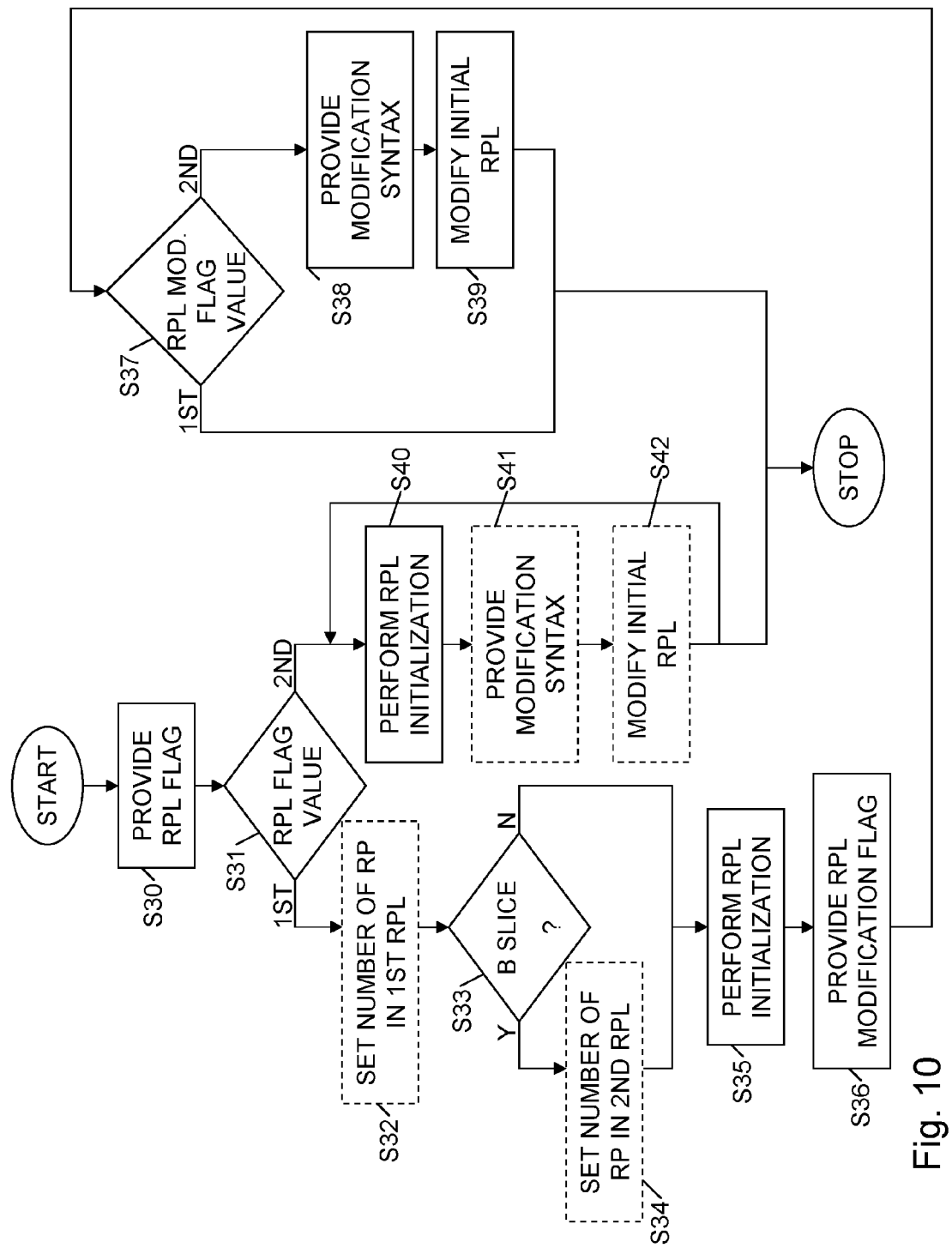
FIG. 10 is a flow diagram of a method of reference picture handling according to a further embodiment.

FIG. 10 is a flow diagram illustrating various embodiments of the method of reference picture list handling. The method generally starts in step S30 where a reference picture list (RPL) flag is provided based on the encoded representation of the picture. This step S30 basically corresponds to step S20 in FIG. 9 and is not further described herein.

In a next step S31 the value of the RPL flag provided in step S30 is investigated. If the RPL flag has a first value, such as $1_{bin}$ (or $0_{bin}$), it is determined, in this step S31, that all slices of the same slice type in the picture have identical final reference picture list or lists. The method then continues to the optional step S32. However, if the RPL flag instead has a second value, such as $0_{bin}$ (or $1_{bin}$), it is preferably determined in step S31 that all slices of the same slice type in the picture do not need to have identical final reference picture list(s). In such a case, the method continues to step S40.

If the RPL flag has the second value as determined in step S31, in an embodiment, all the slices of the picture that are of the same slice type could have the same final reference picture list or lists or they could have different final reference picture list or lists. Hence, the decoder cannot assume that the P slices of the picture all have the same final reference picture list or that the B slices of the picture all have the same reference picture lists.

The optional step S32 preferably comprises setting a respective first parameter indicative of a number of reference pictures (RP) in a first reference picture list (RPL), i.e. L0, to a same value for all slices of the same slice type in the picture, preferably for all slices (P slices and B slices) in the picture. For instance, the parameter num_ref_idx_l0_active_minus1 that defines the number of reference pictures in the reference picture list L0 could be set to the same value for the P and B slices in the picture in step S32. In such a case, the value of this first parameter is preferably retrieved based on the encoded representation of the first slice of the picture. This first parameter could, for example, be retrieved from the slice header of the encoded representation of the first slice.

In a next optional step S33 it is investigated whether the slice type is a so-called B slice or slice type 1. In such a case, at least two reference picture lists are generated for the B slice(s) of the picture. If it is concluded in step S33 that the slice type is a B slice type the method continues to the optional step S34. This optional step S34 comprises setting a respective second parameter (RP) indicative of a number of reference pictures in a second reference picture list (RPL), i.e. L1, to a same value for all B slices of the picture. For instance, the parameter num_ref idx_l1_active_minus1 that defines the number of reference pictures (RP) in the reference picture list (RPL) L1 could be set to the same value for all B slices in the picture in step S34. In such a case, the value of this second parameter is preferably retrieved based on the encoded representation of the first slice of the picture. This second parameter could, for example, be retrieved from the slice header of the encoded representation of the first slice.

In these cases, the values of num_ref idx_l0_active_minus1 and num_ref idx_l1_active_minus1 only need to be determined for the first slice of the picture. Thus, the values are parsed and decoded for the first slice of the picture and then stored in a memory. These values can then be reused, without any data parsing and decoding, for any remaining slice(s) of the picture that is(are) of the same slice type, optionally by retrieving or reading the values from the memory.

In an embodiment a next step S35 comprises performing reference picture list (RPL) initialization. Hence, the method then continues from step S34 for B slices or from step S33 for P slices to step S35. The reference picture list initialization determines at least one initial reference picture list based on the encoded representation in a so-called reference picture list initialization, as previously discussed herein. If the method continued from step S33 one such initial reference picture list (L0) is preferably determined, whereas two initial reference picture lists (L0, L1) are preferably determined in step S35 if the method continued from step S34.

The reference picture list initialization preferably involves listing picture identifiers of the previously decoded pictures of the video sequence that could used as reference pictures for the present picture and/or following, according to the decoding order, pictures in the video sequence. The decoded pictures are, as is well known in the art, generally stored in the decoder in a decoded picture buffer (DPB), also denoted reference picture buffer. In such a case, an initial reference picture list could include identifiers or pointers to reference pictures in the DPB and where these reference pictures have been selected or identified based on information, such as POCs or data enabling calculation of POCs, retrieved based on the encoded representation.

In an embodiment a step S36 comprises providing a RPL modification flag based on the encoded representation. This step S36 preferably corresponds to step S24 in FIG. 9 and is not further disclosed.

If the RPL modification flag has the first value, such as $1_{bin}$ (or $0_{bin}$), as determined in step S37 the at least one initial reference picture list obtained in the reference picture list initialization in step S35 is used as the at least one final reference picture list for all slices of a same slice type in the picture.

If the RPL modification flag provided in step S36 instead has a second value, such as $0_{bin}$ (or $1_{bin}$), as determined in step S37 at least one modified reference picture list obtained by modifying the at least one initial reference picture list obtained in the reference picture list initialization in step S35 is to be used as the at least one final reference picture list for all slices of the same slice type in the picture. Thus, in this case one or more list modification operations should be performed on the at least one initial reference picture list in order to get the final modified reference picture list(s) for the picture.

The method therefore, in this embodiment, continues from step S37 to step S38. In step S38 modification syntax is provided based on the encoded representation of the picture. Hence, at least one list modification parameter or syntax element is provided based on the encoded representation of the picture. The list modification parameter(s) is(are) preferably retrieved from the slice header in the encoded representation but could, alternatively, be provided from a parameter set or other data structure identifiable based on data included in the encoded representation. Non-limiting examples of list modification parameters are presented in Table 1 above.

The at least one list modification parameter provided in step S38 is then used in step S39 to modify at least one initial reference picture list (RPL) of the at least one initial reference picture list obtained in step S35 to get the at least one modified reference picture list.

In FIG. 10 the reference picture list initialization in step S35 is disclosed as being performed prior to the provision of the RPL modification flag in step S36. In alternative embodiments, step S35 is performed at least partly in parallel with step S36 or after step S36. It is even possible to perform step S35 at least partly in parallel with or after step S37 or S38 in FIG. 9.

If the RPL flag provided in step S30 has the second value as determined in step S31 all slices of the picture that are of the same slice type do not necessarily have to have identical final reference picture list(s).

The method then continues from step S31 to step S40. In this step S40 reference picture list (RPL) initialization is performed for the current, typically the first, slice of the picture. This step S40 is basically performed as previously discussed in connection with step S35. Thus, the initial reference picture list L0 or the initial reference picture lists L0, L1 are determined, depending on whether the current slice is a P slice or a B slice.

In a next optional step S41 it is investigated whether there is any modification syntax for the current slice. Hence, this optional step S41 preferably comprises investigating whether there is at least one list modification parameter for the current slice, such as present in the slice header of the encoded representation of the current slice. If there is any such list modification parameter, the parameter(s) is(are) provided based on, such as parsed and decoded from, the encoded representation of the current slice in step S41. This step S41 basically corresponds to step S38.

A next optional step S42 is performed if at least one list modification parameter was provided in step S41. In step S42 the at least one initial reference picture list (RPL) obtained in step S40 is modified based on the at least one list modification parameter provided in step S41. This step S42 basically corresponds to step S39.

In this case, i.e. since the RPL flag had the second value, the loop of step S40 and the optional steps S41, S42 is repeated for each slice of the picture. This means that compared to the previously disclosed embodiments, for which reference picture list initialization (in step S35) and optional list modification (in step S39) is only performed once for all slices of the same slice type, the reference picture list initialization (in step S40) is performed once for each slice in the picture and steps S41 and S42 are also performed once for each slice of the picture that comprise such list modification parameter(s).

Note that even if step S40 is performed once for each slice of the picture steps S41 and S42 are only performed for those slices of the picture that comprise or are associated with any list modification parameter(s).

The loop of steps S40 and S42 typically also comprises steps corresponding to steps S32 to S34, i.e. setting the number of reference pictures in the first reference picture lists and, for any B slices, in the second reference picture lists (compare to steps S32 and S34). However, in clear contrast to the case when the reference picture list flag has the first value the number of reference pictures in the first and second reference picture lists could be set differently for different slices of the same slice type in the picture when performed as a part of the loop of steps S40 and S42. In such a case, these additional steps are preferably performed prior to step S40 and are therefore performed once for each slice in the picture.

In an embodiment as disclosed in FIG. 10 three possible modes or variants are possible as defined by the at least one mode signaling syntax element as represented by the RPL flag and the RPL modification flag in FIG. 10.

Mode 1—The final reference picture list(s) is(are) the same in all slices of the picture (S30-S39).

Mode 2—No restriction, the number of different reference picture lists that is used in one picture is unrestricted and may be as many as there are slices in that picture (steps S30, S31, S40-S42).

Mode 3—No modification of reference picture lists. This means that all slices use the same reference picture list(s), namely the reference picture list(s) that is(are) initialized. There is no list modification done in any slice (steps S30-S37).

In the embodiments disclosed in FIG. 10 the presence of the RPL modification flag is conditioned on the value of the RPL flag. In other words, the RPL modification flag is investigated and used in step S37 if the RPL flag has the first value as determined in step S31.

Figure 11:
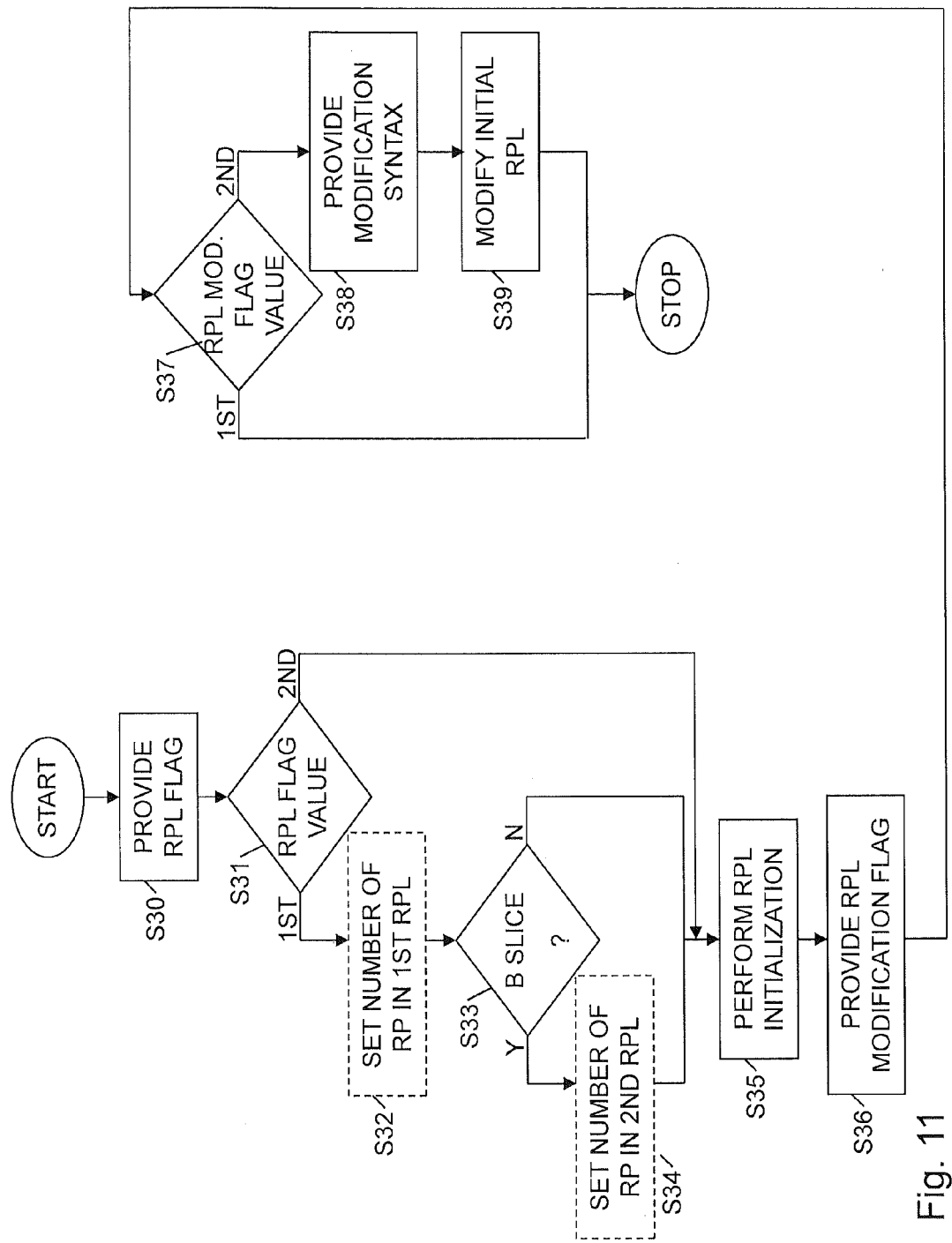
FIG. 11 is a flow diagram of a method of reference picture handling according to still another embodiment.

In alternative embodiments the RPL flag and the RPL modification flag could be independent from each other as shown in FIG. 11. This FIG. 11 is a variant of FIG. 10 but where the presence of the RPL modification flag is not conditioned on the value of the RPL flag.

The embodiments as shown in FIG. 11 therefore encompass steps S30 to S34 relating to the provision of the RPL flag and usage of this RPL flag in order to determine whether all slices of the same slice type in the picture have identical reference picture list or lists or determine whether the slices of the same slice type in the picture do not need to have identical reference picture list or lists. These steps S30 to S34 are performed as previously discussed in connection with FIG. 10.

The method then continues to steps S35, S36 and S37 and thereafter ends if the RPL modification flag has the first value, i.e. indicating that no list modification should be performed and that the at least one initial reference picture list obtained in the reference picture list initialization of step S35 is to be used as the at least one final reference picture list for the slices of the same slice type the picture. Alternatively the method continues to steps S35, S36 and S37 and further to steps S38 and S39 if the RPL modification flag has the second value, i.e. indicating that list modifications should be performed and that the at least one modified reference picture list obtained in step S39 is to be used as the at least one final reference picture list for the slices of the same slice type in the picture.

In the embodiment of FIG. 11 four modes are possible since the method uses two flags, i.e. the RPL flag and the RPL modification flag, and each flag can assume one out of two values ($0_{bin}$ and $1_{bin}$).

Mode 1—If the RPL flag has the first value and the RPL modification flag has the second value (steps S30-S39) the at least one modified reference picture list is to be used for all slices of the picture that are of the same slice type.

Mode 2—If the RPL flag has the first value and the RPL modification flag has the first value (steps S30-S37) the at least one initial reference picture list is to be used for all slices of the picture that are of the same slice type.

Mode 3—If the RPL flag has the second value and the RPL modification flag has the second value (steps S30-S31, S35-S39) the slices of the picture do not need to have identical reference picture list or lists and list modifications can be used to modify the at least one initial reference picture list.

Mode 4—If the RPL flag has the second value and the RPL modification flag has the first value (steps S30-S31, S35-S37) the slices of the picture do not need to have identical reference picture list or lists but list modifications are not used for any slice of the picture for which the RPL modification flag has the first value.

FIG. 13 is a flow diagram illustrating a method of encoding a picture of a video sequence, where the picture comprises multiple slices. The method generally starts in step S50, in which it is determined whether final reference picture list or lists is or are the same for all slices of a same slice type in the picture.

In a next step S51 an encoded representation of the picture is generated. This step S51 generally comprises encoding, typically independently encodes, each slice of the picture into a respective encoded representation of the slice comprising a respective slice header and slice data. The encoded representations of the slices are typically organized into NAL units, which may be further packaged into data packets as previously disclosed herein.

The method also comprises step S52, in which at least one mode signaling syntax element indicative of whether the final reference picture list or lists is or are the same for all slices of the same slice type in the picture is associated with or to the encoded representation. This step S52 can be performed prior to, after or substantially in parallel with step S51.

Associating the at least one mode signaling syntax element with the encoded representation can be performed according to various embodiments as mentioned herein. The information could, for instance, be added to the encoded representation, such as inserted into the slice header of the encoded representation in step S52. The at least one mode signaling syntax element could be inserted into the encoded representation of the first slice of the picture, such as in the slice header for this first slice in step S52. However, in order to provide robustness in the case the encoded representation of the first slice got lost during the transmission from the encoder to the decoder, each encoded representation of a slice for the picture preferably comprises the at least one syntax element.

As an alternative of inserting the at least one mode signaling syntax element into the slice header of the encoded representation of the slices for the picture the at least one mode signaling syntax element could be inserted, in step S52, into one or more parameter sets. In such a case, one or more parameter set identifiers enabling identification of the relevant parameter set(s) is(are) inserted, in step S52, into the encoded representation of the picture, for instance in the slice headers of each slice in the picture. It is also possible to include the at least one mode signaling syntax element in other data structures, such as VUI and/or SEI.

If the at least one mode signaling syntax element comprises multiple mode signaling syntax elements, such as multiple flags, these could be distributed among a parameter set, other data structure, such as VUI or SEI, and slice headers as previously disclosed herein.

When inserting the at least one mode signaling syntax element into a parameter set or other data structure, such as VUI, the at least one mode signaling syntax element typically applies to a sequence of multiple pictures in the video stream, possibly all pictures in the video stream. In more detail, if a mode signaling syntax element is present in a parameter set, such as SPS, or other data structure, such as VUI, the mode signaling syntax element applies to all pictures in the video stream that refer to this parameter set or this data structure. In other words, the mode signaling syntax element applies to all pictures that comprise a parameter set identifier directly or indirectly (PPS identifier to a PPS that comprises an SPS identifier to the SPS) identifies the parameter set or an identifier or other information defining that the data structure, such as VUI, applies to the pictures.

In such an approach the associating step S52 of FIG. 13 could involve inserting, into a parameter set or a data structure associated with the bitstream, a mode signaling syntax element indicative of whether final reference picture list or lists is or are the same for all slices of a same slice type in any picture for which the parameter set or data structure applies. Step S52 further comprises inserting a parameter set identifier or data structure identifying information enabling identification of the parameter set or data structure into a respective encoded representation of the any picture.

This means that the mode signaling syntax element does not necessarily need to be determined for each picture in the video stream. In clear contrast, a mode signaling syntax element could be determined once and included in a parameter set or other data structure and then apply to a sequence of pictures in the video stream that refer to this parameter set or data structure through a respective parameter set identifier or data structure identifier.

Figure 14:
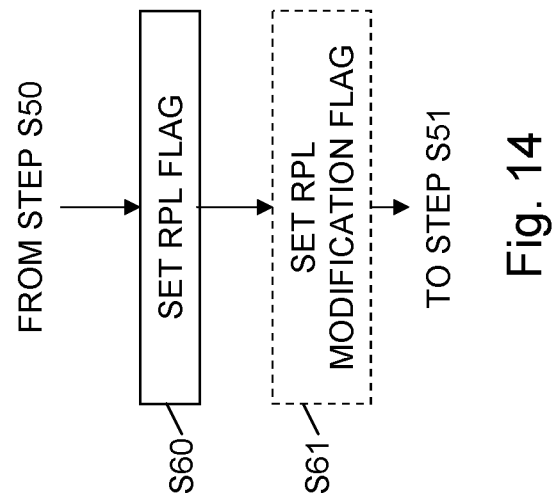
FIG. 14 is a flow diagram illustrating additional, optional steps of the method in FIG. 13.

FIG. 14 is a flow diagram illustrating additional, optional steps of the method in FIG. 13. In step S60 a RPL flag is set or determined to a first value, such as $1_{bin}$ (or $0_{bin}$), if the final reference picture list(s) is(are) the same for all slices of the same slice type in the picture. Correspondingly, in step S60 the RPL flag is set or determined to a second value, such as $0_{bin}$ (or $1_{bin}$), if the final reference picture list(s) do(es) not need to be the same for all slices of the same slice type in the picture.

The method could then, in an embodiment, continue to step S51 of FIG. 13. The set RPL flag is then associated with the generated encoded representation of the picture, such as included in an SPS referred to by the encoded representation or in a VUI.

In an optional embodiment an additional step S61 could be performed. In an embodiment this step S61 is performed if the RPL flag as set or determined in step S60 to have the first value, i.e. if all the slices of the same slice type in the picture have identical final reference picture list(s). In another embodiment step S61 is not dependent on the value of the RPL flag. Hence, in this embodiment step S61 is performed even if the RPL flag is set to have the second value in step S60.

In step S61 a RPL modification flag is set or determined to have a first value, such as $1_{bin}$ (or $0_{bin}$), if at least one initial reference picture list obtained in a reference picture list initialization is to be used as the at least one final reference picture list for all slices of the same slice type in picture. Thus, the RPL modification flag is set to have the first value if no list modification operations should be performed on the at least one initial reference picture list for the slices.

Correspondingly, in step S61 the RPL modification flag is preferably set or determined to have a second value, such as $0_{bin}$ (or $1_{bin}$), if at least one modified reference picture list obtained by modifying at least one initial reference picture list obtained in a reference picture list initialization is to be used as the at least one final reference picture list for all slices of the picture that are of the same slice type. Thus, the RPL modification flag is set to have the second value if at least one list modification operation should be performed on an initial reference picture list to get a modified reference picture list for the slices.

The method then continues to step S51 of FIG. 13 where the RPL flag as set in step S60 and the optional RPL modification flag as set in step S61 are associated with the encoded representation of the picture. For instance, the flags could be included in a parameter set, such as SPS or PPS, or the RPL flag could be included in a VUI whereas the RPL modification flag is included in a parameter set, such as SPS or PPS.

Various example embodiments will now be further described herein.

In a first example embodiment, the slice elements comprise, i.e. the mode signaling syntax elements signal, three possible modes that the decoder can deduce from the bitstream:

1. The final reference picture lists are the same in all slices of the same picture. It should be noted that modification information is sent repeatedly in each slice header.
2. No restriction, the number of different reference picture lists that is used in one picture is unrestricted and may be as many as there are slices in that picture.
3. No modification of reference picture lists. This means that all slices use the same reference picture lists, namely the initial reference picture list(s) that is(are) initialized. There is no list modification done in any slice.

In a preferred example a syntax element in the SPS or in the PPS indicates which mode is used for all pictures that reference the parameter set. When mode 3 is used for a specific picture, no reference picture list modification syntax is signaled in the slice headers in that picture. For HEVC, the presence of reference picture list modification syntax is conditioned on the mode:

```
if( mode != 3 )
    ref_pic_list_modification( )
    ref_pic_list_combination( )
```

Alternatively, if reference picture list combination is not used:

```
if( mode != 3 )
    ref_pic_list_modification( )
```

Note that the numbering of the modes is just an example. The actual numbering may be different, e.g. use 0, 1, 2 instead of 1, 2, 3.

In one example, the three modes listed above are signaled using two flags in, for instance, the SPS where the second flag is conditioned on the first flag. The syntax and semantics for HEVC may look like this:

| seq_parameter_set_rbsp( ) { | Descriptor |
|---|---|
| ... | |
|     identical_ref_pic_lists_flag | u(1) |
|     if( identical_ref_pic_lists_flag == 1 ) { | |
|         ref_pic_list_modification_not_present_flag | u(1) |
|     } | |
| ... | |
| } | | identical_ref_pic_lists_flag, i.e. the previously mentioned RPL flag, equals to 1 indicates that all slices of the same slice type that belong to the same picture have identical reference picture lists. identical_ref_pic_lists_flag equal to 0 indicates that there may be slices of the same slice type that belong to the same picture that have different reference picture lists. num_ref_idx_l0_active_minus1 and num_ref_idx_l1_active_minus1 shall when present be identical for all slices of the same slice type that belong to the same picture when identical_ref_pic_lists_flag is equal to 1.

ref_pic_list_modification_not_present_flag, i.e. the previously mentioned RPL modification flag, equal to 1 specifies that the syntax elements ref_pic_list_modification_flag_l0, ref_pic_list_modification_flag_l1 and, the optional, ref_pic_list_combination_flag are not present. no_ref_pic_list_modification_present_flag equal to 0 specifies that syntax elements ref_pic_list_modification_flag_l0, ref_pic_list_modification_flag_l1 and optionally ref_pic_list_combination_flag are present. When ref_pic_list_modification_present_flag is not present, it shall be inferred to be equal to 0.

```
slice_header( ) {
    ...
    if( ref_pic_list_modification_not_present_flag == 0 ) {
        ref_pic_list_modification( )
        ref_pic_list_combination( )
    }
    ...
}
```

Alternatively, if reference picture list combination is not used:

```
slice_header( ) {
    ...
    if( ref_pic_list_modification_not_present_flag == 0 ) {
        ref_pic_list_modification( )
    }
    ...
}
```

When ref_pic_list_modification_flag_l0 is not present, it shall be inferred to be equal to 0. When ref_pic_list_modification_flag_l1 is not present, it shall be inferred to be equal to 0. When the optional ref_pic_list_combination_flag is not present, it shall be inferred to be equal to 0.

In a second example embodiment, the slice elements comprise that reference picture list modifications are defined to always be the same for all slices of a picture.

In a preferred example there are two possible modes that the decoder can deduce from the bitstream:
1. Same modification in all slices of the same picture
2. No modification of reference picture lists In a preferred example a syntax element in the SPS or in the PPS indicates which mode is used for all pictures that reference the parameter set. When mode 2 is used for a specific picture, no reference picture list modification syntax is signalled in the slice headers of that picture.

The second example embodiment is identical to the previous example embodiment but without the flag. It is like the flag is always indicating that the lists are equal, only that there is no flag sent in this example embodiment.

In a third example embodiment the reference picture list modification syntax is changed to save bits when reference picture list modification is not used for a specific B slice. In the current design of HEVC there are two flags, each using one bit, are used for B slices to signal that no reference picture list modifications are used. This example embodiment consists of introducing a single one-bit flag to control or replace the other two flags. A simplified version of the current syntax is shown in the syntax example below. If the slice type is P or B, one flag is parsed that indicates whether there are modifications for the L0 list which is used for both P and B slices. If the slice type is B, one flag to indicate whether there are modifications for the L1 list is parsed. This means that there are two flags to parse for the case when there are no list modifications.

| Prior art syntax: | |
|---|---|
| ref_pic_list_modification( ) { | Descriptor |
|   if( slice_type != 2 ) { | |
|     ref_pic_list_modification_flag_l0 | u(1) |
|     if( ref_pic_list_modification_flag_l0 ) | |
|       modification_l0( ) | |
|   } | |
|   if( slice_type == 1 ) { | |
|     ref_pic_list_modification_flag_l1 | u(1) |
|     if( ref_pic_list_modification_flag_l1 ) | |
|       modification_l1( ) | |
|   } | |
| } | |

As an example, if you want to signal that there are no modifications for a B slice, the bitstream needs to contain two bits, ref_pic_list_modification_flag_l0=0 and ref_pic_list_modification_flag_l1=0.

The simplified syntax in which the two other flags are conditioned on (controlled by) the first flag could for example look like the syntax example below. Here one flag is introduced to indicate whether there are modifications for either L0 or L1. This means that only one flag needs to be parsed for the case where there are no modifications, which saves one bit for this case.

| Example syntax: | |
|---|---|
| ref_pic_list_modification( ) { | Descriptor |
|   if( slice_type != 2 ) { | |
|     ref_pic_list_modification_flag | u(1) |
|     if( ref_pic_list_modification_flag ) { | |
|       ref_pic_list_modification_flag_l0 | u(1) |
|       if( ref_pic_list_modification_flag_l0 ) | |
|         modification_l0( ) | |
|       if( slice_type == 1 ) { | |
|         ref_pic_list_modification_flag_l1 | u(1) |
|         if( ref_pic_list_modification_flag_l1 ) | |
|           modification_l1( ) | |
|       } | |
|     } | |
|   } | |
| } | |

The syntax in which the two other flags are replaced by the first flag could for example look like this:

| ref_pic_list_modification( ) { | Descriptor |
|---|---|
|   if( slice_type != 2 ) { | |
|     ref_pic_list_modification_flag | u(1) |
|     if( ref_pic_list_modification_flag ) { | |
|       modification_l0( ) | |
|       if( slice_type == 1 ) | |
|         modification_l1( ) | |
|     } | |
|   } | |
| } | |

The example with no modifications for a B slice will for both these new syntax structures need only one bit, namely ref_pic_list_modification_flag=0. That is one bit less than for the prior art syntax.

In the current design of HEVC there is a restriction that none of modification_l0( ) and modification_l1( ) can contain zero modifications, i.e. the first value in the loop must not be the "end-of-loop"-value. In the second version of this example embodiment (where the two flags are replaced by a single flag) it is preferred to remove this restriction. Alternatively the restriction can be kept for P slices and changed for B slices such that it is specified that not both modification_l0( ) and modification_l1( ) can contain zero entries. That means that for at least one of the loops the first value must not be the "end-of-loop"-value.

The third example embodiment can be combined with any of the other example embodiments. The simplified syntax is in this example embodiment information indicative of one or more slice elements which are kept the same for all slices in a picture.

The picture list construction mechanisms in HEVC are very flexible. Full flexibility is provided by using ref_pic_list_modification( ) and optionally ref_pic_list_combination( ) syntax. Moreover, reference picture list construction is done separately for each slice, enabling the use of different lists within the same picture.

Although the possibility of using different reference picture lists for different parts of the picture is nice, it is very rare to see this used in real-life bitstreams. Also, the reference picture list construction process is a burden for the decoder if there are many slices for each picture, since reference picture list construction is generally not part of decoding hardware but done on relatively slow general purpose processors.

In a fourth example embodiment a flag is added to, for instance, the SPS to indicate whether different reference picture lists are used for the same slice type in any picture in the bitstream or not. If this flag is set to 1, the reference picture lists for all slices of the same type in the same picture are the same. Different pictures may have different reference picture lists but reference picture list construction for all slices of the same type in one picture is identical. This means that a decoder can perform the reference picture list construction once for each picture no matter how many slices there are. Additionally, conditioned on this first flag, another flag could be added to indicate whether there are any reference picture list modifications at all. If there are not, it is not necessary to include ref_pic_list_modification( ) nor the optional ref_pic_list_combination( ) in the slice header.

A possible syntax example could then be:

| seq_parameter_set_rbsp( ) { | Descriptor |
|---|---|
|   ... | |
|   num_reorder_frames | ue(v) |
|   identical_ref_pic_lists_flag | u(1) |
|   if( identical_ref_pic_lists_flag == 1 ) { | |
|     ref_pic_list_modification_not_present_flag | u(1) |
|   } | |
|   ... | |
| } | | identical_ref_pic_lists_flag equal to 1 indicates that all slices of the same slice type that belong to the same picture have identical reference picture lists. identical_ref_pic_lists_flag equal to 0 indicates that there may be slices of the same slice type that belong to the same picture that have different reference picture lists. num_ref idx_l0_active_minus1 and num_ref idx_l1_active_minus1 shall when present be identical for all slices of the same slice type that belong to the same picture when identical_ref_pic_lists_flag is equal to 1.

ref_pic_list_modification_not_present_flag equal to 1 (or 0) specifies that the syntax elements ref_pic_list_modification_flag_l0, ref_pic_list_modification_flag_l1 and the optional ref_pic_list_combination_flag are not present. no_ref_pic_list_modification_present_flag equal to 0 (or 1) specifies that syntax elements ref_pic_list_modification_flag_l0, ref_pic_list_modification_flag_l1 and the optional ref_pic_list_combination_flag are present. When ref_pic_list_modification_present_flag is not present, it shall be inferred to be equal to 0.

| slice_header( ) { | Descriptor |
|---|---|
|   ... | |
|   if( ref_pic_list_modification_not_present_flag == 0 ) { | |
|     ref_pic_list_modification( ) | |
|     ref_pic_list_combination( ) | |
|   } | |
|   ... | |
| } | | ref_pic_list_modification_flag_l0 equal to 1 specifies that the syntax element list_modification_idc is present for specifying reference picture list 0. ref_pic_list_modification_flag_l0 equal to 0 specifies that this syntax element is not present.

When ref_pic_list_modification_flag_l0 is equal to 1, the number of times that list_modification_idc is not equal to 2 following ref_pic_list_modification_flag_l0 shall not exceed num_ref idx_l0_active_minus1+1. When ref_pic_list_modification_flag_l0 is not present, it shall be inferred to be equal to 0.

ref_pic_list_modification_flag_l1 equal to 1 specifies that the syntax element list_modification_idc is present for specifying reference picture list 1. ref_pic_list_modification_flag_l1 equal to 0 specifies that this syntax element is not present. When ref_pic_list_modification_flag_l1 is equal to 1, the number of times that list_modification_idc is not equal to 2 following ref_pic_list_modification_flag_l1 shall not exceed num_ref idx_l1_active_minus1+1. When ref_pic_list_modification_flag_l1 is not present, it shall be inferred to be equal to 0.

The optional ref_pic_list_combination_flag equal to 1 indicates that the reference picture list 0 and the reference picture list 1 are combined to be an additional reference picture lists combination used for the prediction units being uni-directional predicted. This flag equal to 0 indicates that the reference picture list 0 and reference picture list 1 are identical thus reference picture list 0 is used as the reference picture lists combination. The reference picture lists combination is set to be empty at the start of the loop defined in this table. When ref_pic_list_combination_flag is not present, it shall be inferred to be equal to 0.

A fifth example embodiment is similar to the fourth example embodiment, but one or more HEVC profiles restrict the use of identical_ref_pic_lists_flag as follows. The value of identical_ref_pic_lists_flag shall be equal to a specific value that indicates that final reference picture list(s) is(are) identical for all slices of the same slice type in the picture. This specific value could be 1.

In a sixth example embodiment the SPS RBSP syntax look like

| seq_parameter_set_rbsp( ) { | Descriptor |
|---|---|
| profile_idc | u(8) |
| ... | |
| restricted_ref_pic_lists_flag | u(1) |
| if( restricted_ref_pic_lists_flag ) | |
|     list_modification_present_flag | u(1) |
| ... | |
| } | | restricted_ref_pic_lists_flag equal to 1 indicates that all slices of the same slice type that belong to the same picture have identical reference picture lists. restricted_ref_pic_lists_flag equal to 0 indicates that there my be slices of the same slice type that belong to the same picture that have different reference picture lists.

num_ref idx_active_override_flag, num_ref idx_l0_active_minus1 and num_ref idx_l1_active_minus1 shall when present be identical for all slices having the same value of slice_type that belongs to the same picture when restricted_ref_pic_lists_flag is equal to 1.

list_modificationpresent_flag equal to 0 specifies that the syntax structure ref_pic_list_modification( ) is not present in the slice header. list_modificationpresent_flag equal to 1 specifies that the syntax structure ref_pic_list_modification( ) is present in the slice header. When not present, the value of list_modification_present_flag is inferred to be equal to 1.

| slice_header( ) { | Descriptor |
|---|---|
| first_slice_in_pic_flag | u(1) |
| ... | |
| if( list_modification_present_flag ) | |
|     ref_pic_list_modification( ) | |
| ... | |
| } | |

A seventh example embodiment is similar to the sixth example embodiment disclosed above but with the restriction_ref_pic_lists_flag present in a VUI and the lists_modification_present_flag present in a PPS. In an example there are no constraints on the value combinations of these two flags.

The presence of any VUI parameters could be signaled in the SPS as defined below:

| seq_parameter_set_rbsp( ) { | Descriptor |
|---|---|
| ... | |
| vui_parameters_present_flag | u(1) |
| if( vui_paraemters_present_flag ) | |
|     vui_parameters( ) | |
| ... | |
| } | |

The syntax for the VUI parameters could then be as defined below:

| vui_parameters( ) { | Descriptor |
|---|---|
| ... | |
| bitstream_restriction_flag | u(1) |
| if( bitstream_restriction_flag ) { | |
|     ... | |
|     restricted_ref_pic_lists_flag | u(1) |
|     ... | |
| } | |
| } | |

The reference picture list modification flag may then be signaled in the PPS:

| pic_parameter_set_rbsp( ){ | Descriptor |
|---|---|
| ... | |
| lists_modification_present_flag | u(1) |
| ... | |
| } | |

Here below follows an example of a portion of the slice header syntax:

| slice_header( ) { | Descriptor |
|---|---|
| ... | |
| if( slice_type == P \|\| slice_type ==B ) { | |
|   num_ref_idx_active_override_flag | u(1) |
|   if( num_ref_idx_active_override_flag ) { | |
|     num_ref_idxl0_active_minus1 | |
|     if( slice_type == B ) | |
|       num_ref_idxl1_active_minus1 | |
|   } | |
| ... | |
| if( lists_modification_present_flag ) | |
|   ref_pic_lists_modification( ) | |
| ... | |
| } | |

| | Descriptor |
|---|---|
| ref_pic_lists_modification( ) { | |
|   ref_pic_list_modification_flag_l0 | u(1) |
|   if(ref_pic_list_modification_flag_l0) | |
|     for( i = 0; i ≤ num_ref_idxl0_active_minus1; i++) | |
|       list_entry_l0[i] | u(v) |
|   if( slice_type == B ) { | |
|     ref_pic_list_modification_flag_l1 | u(1) |
|     if(ref_pic_list_modification_flag_l1) | |
|       for( i = 0; i ≤ num_ref_idxl1_active_minus1; i++) | |
|         list_entry_l1[i] | u(v) |
|   } | |
| } | | restricted_ref_pic_lists_flag equal to one indicates that all slices of the same slice type that belong to the same picture have identical reference picture lists. restricted_ref_pic_lists_flag equal to zero indicates that there may be slices of the same slice type that belong to the same picture that have different reference picture lists. The syntax elements num_ref idx_active_override_flag, num_ref idx_l0_active_minus1, num_ref idx_l1_active_minus1, ref_pic_list_combination_flag and num_ref idx_lc_active_minus1 are, when present, identical for all slices of the same slice type that belong to the same picture when restricted_ref_pic_lists_flag is equal to one.

lists_modification_present_flag equal to zero specifies that the syntax structures ref_pic_list_modification( ) and ref_pic_list_combination( ) are not present in the slice header.

lists_modification_present_flag equal to one specifies that the syntax structures ref_pic_list_modification( ) and ref_pic_list_combination( ) are present in the slice header.

ref_pic_list_modification_flag_lX (with X equal to 0 or 1) equal to one indicates that reference picture list X is specified explicitly as a list of list_entry_lX[i] values (with X being 0 or 1). ref_pic_list_modification_flag_lX equal to zero indicates that reference picture list X is determined implicitly.

An eighth example embodiment is similar to the seventh example embodiment present above. However, in this example embodiment restricted_ref_pic_lists_flag equal to one indicates that all P and B slices (if present) that belong to the same picture have an identical reference picture list 0, and that all B slices (if present) that belong to the same picture have an identical reference picture list 1.

lists_modification_present_flag equal to one specifies that the syntax structure ref_pic_lists_modification( ) is present in the slice segment header. lists_modification_present_flag equal to zero specifies that the syntax structure ref_pic_lists_modification( ) is not present in the slice segment header.

ref_pic_list_modification_flag_l0 equal to one indicates that reference picture list 0 is specified explicitly as a list of list_entry_l0[i] values. ref_pic_list_modification_flag_l0 equal to zero indicates that reference picture list 0 is determined implicitly.

ref_pic_list_modification_flag_l1 equal to one indicates that reference picture list 1 is specified explicitly as a list of list_entry_l1[i] values. ref_pic_list_modification_flag_l1 equal to zero indicates that reference picture list 1 is determined implicitly.

Figure 12:
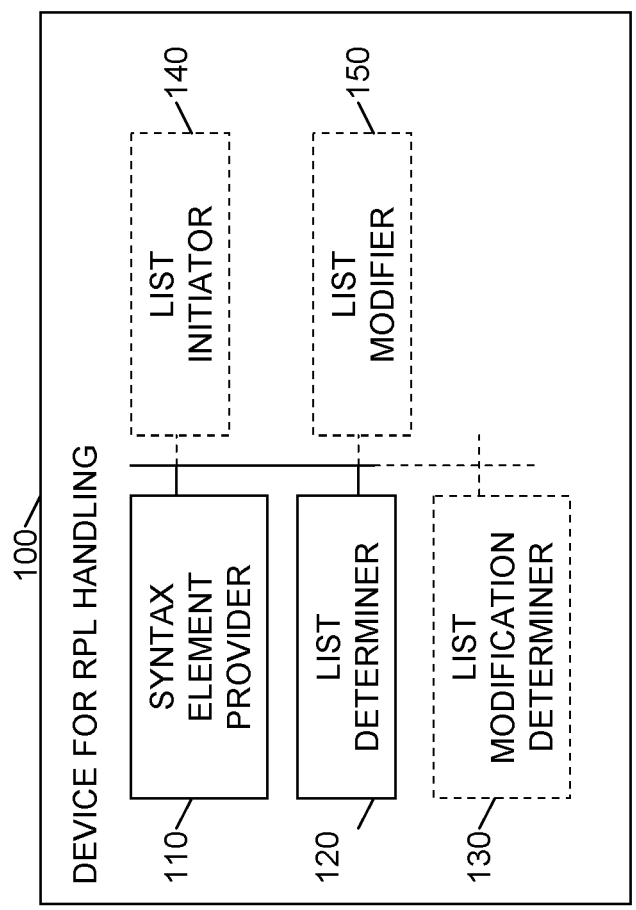
FIG. 12 is a schematic block diagram of a device for reference picture handling according to an embodiment.

FIG. 12 is a schematic block diagram of a device 100 for reference picture list (RPL) handling. The device 100 comprises a syntax element provider 110, also denoted syntax element providing unit, means or module. The syntax element provider 110 is configured to provide at least one mode signaling syntax element based on an encoded representation of a picture in a video sequence. The picture comprises multiple slices.

The syntax element provider 110 could parse and decode the at least one mode signaling syntax element from the encoded representation itself, such as from the slice header of an encoded representation of a slice, typically the first slice of the picture. Alternatively, or in addition, the syntax element provider 110 retrieves the at least one mode signaling syntax element from a data structure of or associated with the bitstream of the video sequence, such as from a parameter set, VUI or SEI. In such a case, the syntax element provider 110 could identify the relevant data structure based on data retrieved from the encoded representation, such as from a slice header.

The at least one mode signaling syntax element provided by the syntax element provider 110 is employed by a list determiner 120, also denoted list determining unit, means or module, of the device 100. The list determiner 120 is configured to determine, based on the at least one mode signaling syntax element provided by the syntax element provider 110, whether final reference picture list or lists is or are the same for all slices of a same slice type in the picture.

The list determiner 120 therefore checks the value(s) of the at least one mode signaling syntax element to determine or decide whether all slices of the same slice type in the picture could have identical final reference picture list(s) or do not need to have identical reference picture list(s).

In an embodiment the list determiner 120 is configured to determine, based on the at last one mode signaling syntax element, whether a final reference picture list is the same for all P slices in the picture and final reference picture lists are the same for all B slices in the picture.

In a further preferred embodiment the list determiner 120 is configured to determine, based on the at last one mode signaling syntax element, whether a final reference picture list L0 is the same for all P slices and all B slices in the picture and a final reference picture list L1 is the same for all B slices in the picture.

The list determiner 120 is configured, in a particular embodiment, to determine, based on the at last one mode signaling syntax element, whether i) the final reference picture list(s) is(are) the same for all slices of the same slice type in the picture or ii) the number of different reference picture lists used in the picture is unrestricted.

In an embodiment the syntax element provider 110 is configured to provide a RPL flag based on the encoded representation of the picture. In such a case, the list determiner 120 is configured to determine that the final reference picture list(s) is(are) the same for all slices of the same slice type in the picture if the RPL flag has a first value.

Correspondingly, the list determiner 120 is configured to determine that the final reference picture list(s) do(es) not need to be the same, i.e. identical, for all slices of the same slice type if the RPL flag has a second, different value.

The device 100 optionally comprises a list modification determiner 130, also denoted list modification determining unit, means or module. The list modification determiner 130 is configured to determine, based on the at least one mode signaling syntax element, whether any reference picture list modification is applied to initial reference picture list(s) to form the final reference picture list(s).

In a particular embodiment the syntax element provider 110 is configured to provide a r RPL modification flag based on the encoded representation of the picture, such as from a parameter set. The syntax element provider 110 is optionally configured to provide this RPL modification flag if the RPL flag has the first value.

In such a case, the list modification determiner 130 is preferably configured to determine, if the RPL modification flag has a first value, that the initial reference picture list(s) obtained in a reference picture list initialization is(are) to be used as the final reference picture list(s) preferably for all slices of the same slice type in the picture. Correspondingly, the list modification determiner 130 is preferably configured to determine, if the RPL modification flag has a second, different value, that modified reference picture list(s) obtained by modifying the initial reference picture list(s) obtained in a reference picture list initialization is(are) to be used as the final reference picture list(s) preferably for all slices of the same slice type in the picture.

The device 100 preferably comprises, in an embodiment, an optional list initiator 140, also denoted list initiating unit, means or module, configured to determine the at least one initial reference picture list in a reference picture list initialization. The list initiator 140 determines the at least one initial reference picture list based on the encoded representation of the picture, such as based on syntax element(s) present in the slice header and/or retrieved from a parameter set based on syntax element(s) present in the slice header.

In an embodiment the device 100 preferably comprises a list modifier 150, also denoted list modifying unit, means or module, configured to modify the at least one initial reference picture list based on at least one list modification parameter retrieved based on the encoded representation of the picture.

Figure 2:
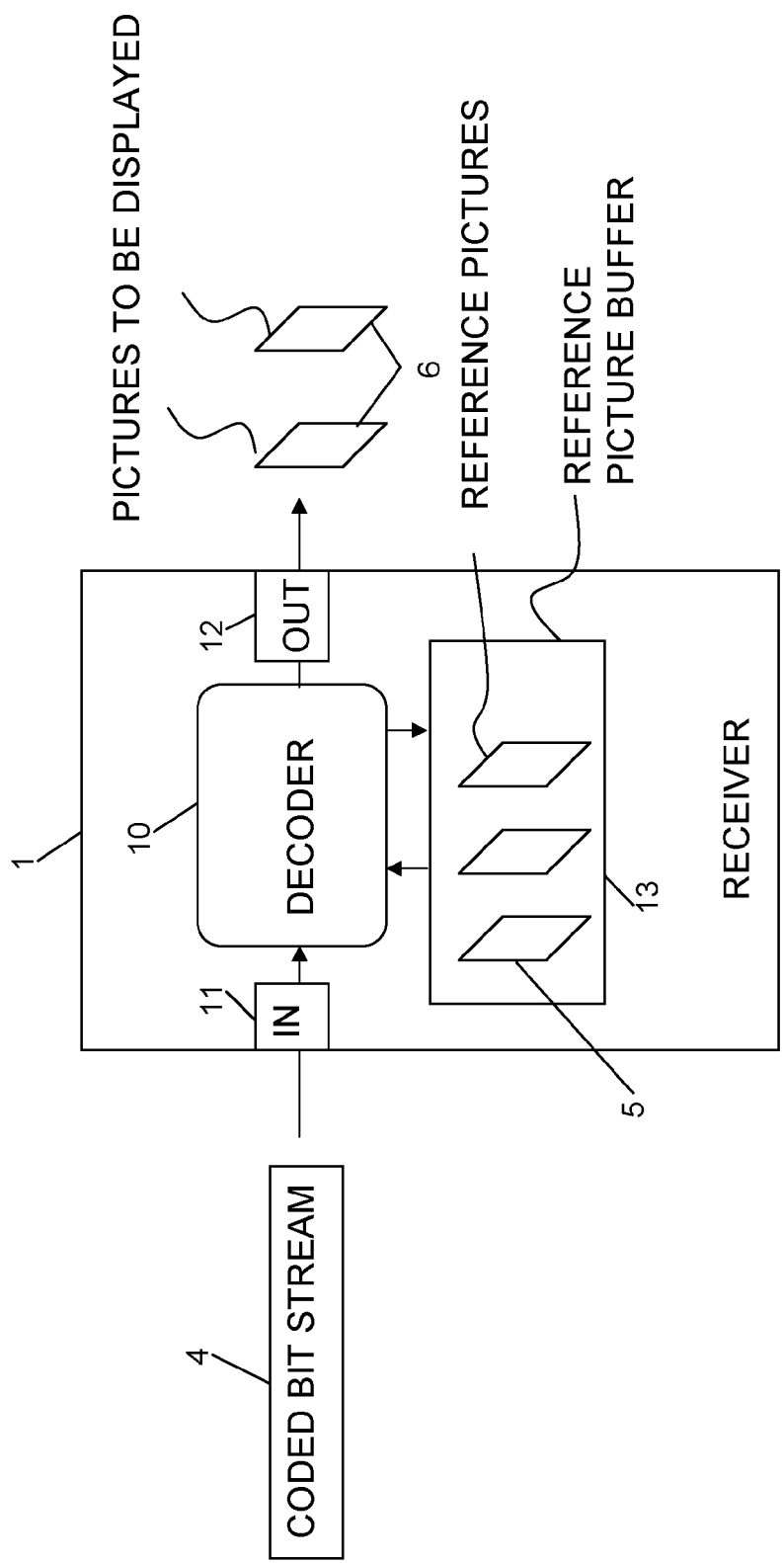
FIG. 2 is a schematic block diagram of a receiver according to an embodiment.

The device 100 of FIG. 12 is preferably implemented as a part of a decoder or at least connected to and configured to operate in cooperation with a decoder. FIG. 2 illustrates such a decoder 10 that comprises a device for reference picture list handling. The figure illustrates the decoder 10 arranged or implemented in a device, such as mobile devices, exemplified as mobile telephones, tablets, video cameras, etc. In FIG. 2 this device has been denoted as a general receiver 1.

The receiver 1 comprises an input or input unit 11 configured to receive a coded bitstream 4, i.e. encoded representations of pictures of a video sequence, typically in the form of NAL units as shown in FIG. 3. The decoder 10 then, through the device for reference picture list handling, receives the at least one syntax element. The decoder 10 uses the at least one syntax element when determining whether the reference picture list(s) defining which reference picture(s) 5 stored in a reference picture buffer 13 could be reused between slices of the picture. The reference picture(s) 5 stored in the reference picture buffer 13 could be used as decoding basis for the current picture and/or following, according to the decoding order, pictures of the video sequence. The decoder 10 is configured to decode the encoded representations based on the reference pictures 5 as defined by the at least one reference picture list to form decoded pictures. The receiver 1 also comprises an output or output unit 12 configured to output the decoded pictures 6, for instance, to be displayed on a screen or display of or connected, including wirelessly connected, to the receiver 1. Output of decoded pictures 6 could also be for alternative purposes, such as saved on file, fed to a transcoding process, etc.

The device 100 for reference picture list handling of FIG. 12 with its including units 110-150 could be implemented in hardware. There are numerous variants of circuitry elements that can be used and combined to achieve the functions of the units 110-150 of the device 100. Such variants are encompassed by the embodiments. Particular examples of hardware implementation of the device 100 is implementation in digital signal processor (DSP) hardware and integrated circuit technology, including both general-purpose electronic circuitry and application-specific circuitry.

The device can also be implemented by means of a processor and a memory. Thus, in an embodiment the device is implemented e.g. by one or more of a processor and adequate software with suitable storage or memory therefore, a programmable logic device (PLD) or other electronic component(s).

Figure 5:
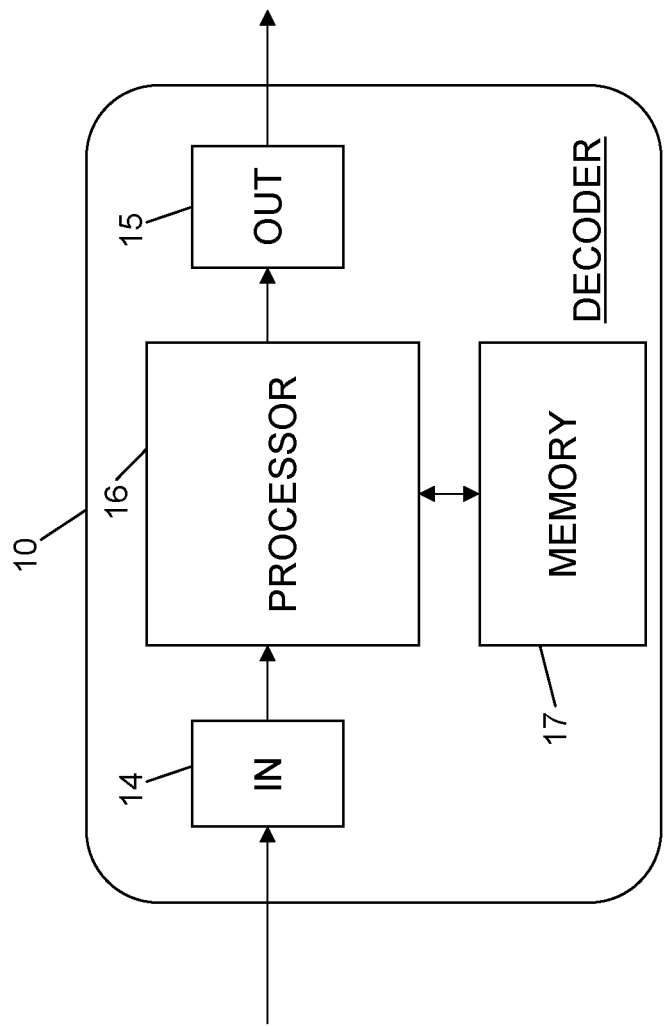
FIG. 5 is a schematic block diagram of a decoder according to an embodiment.

The decoder as shown in FIG. 2 could be implemented in hardware as discussed above for the device for reference picture list handling. The functionality of the decoder 10 could, alternatively, be implemented by means of a processor 16 and a memory 17 as shown in FIG. 5. The decoder 10 preferably comprises the previously mentioned input unit 14 and output unit 15 for receiving encoded representation of pictures in a video sequence and outputting decoded pictures, respectively.

Figure 15:
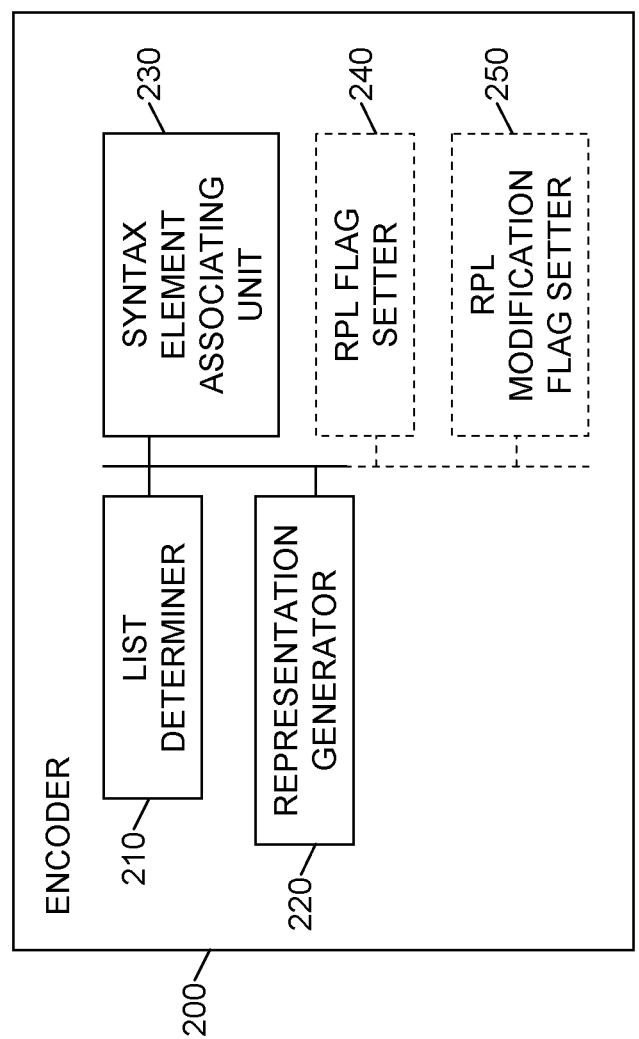
FIG. 15 is a schematic block diagram of an encoder according to another embodiment.

FIG. 15 is a schematic block diagram of an encoder 200 configured to encode a picture comprising multiple slices of a video sequence. The encoder 200 comprises a list determiner 210, also denoted list determining unit, means or module. The list determiner 210 is configured to determine whether final reference picture list or lists is or are the same for all slices of a same slice type in the picture. A representation generator 220, also denoted representation generating unit, means or module, is implemented in the encoder 200 to generate an encoded representation of the picture. The representation generator 220 preferably generates the encoded representation as previously disclosed herein.

A syntax element associating unit 230, also denoted syntax element associator or syntax element associating means or module, is configured to associate at least one mode signaling syntax element, indicative of whether the final reference picture list(s) is(are) the same for all slices of the same slice type in the picture, with the encoded representation as generated by the representation generator 220. The syntax element associating unit 230 could, for instance, include the at least one mode signaling syntax element in the slice header of the encoded representation or in a data structure, such as parameter set, VUI or SEI, identifiable based on the encoded representation, such as an identifier present in the slice header.

The encoder 200 optionally comprises a reference picture list (RPL) flag setter 240, also denoted RPL flag setting unit, means or module. The RPL flag setter 240 is configured to set a RPL flag to a first value if all multiple slices of the same slice type in the picture have identical final reference picture list(s), i.e. if the final reference picture list(s) is(are) the same for all slices of the same slice type in the picture. Correspondingly, the RPL flag setter 240 preferably sets the RPL flag to a second value if the final reference picture list(s) do(es) not need to be the same for all slices of the picture of the same slice type in the picture, i.e. if all slices of the same slice type in the picture do not need to have identical final reference picture list(s).

This RPL flag is then associated with the encoded representation, such as included in a parameter set or VUI, by the syntax element associating unit 230.

The encoder 200 optionally comprises a reference picture list (RPL) modification flag setter 250, also referred to as RPL modification flag setting unit, means or module. The RPL modification flag setter 250 is preferably configured to set a RPL modification flag to one of a first and a second value. In a particular embodiment, the RPL modification flag setter 250 sets the reference picture list modification flag to a first value if initial reference picture list(s) obtained in a reference picture list initialization is(are) to be used as the final reference picture list(s) preferably for all slices of the same slice type in the picture. The RPL modification flag setter 250 correspondingly sets the RPL modification flag to the second value if at least one modified reference picture list obtained by modifying the at least one initial reference picture list is to be used as the at least one final reference picture list preferably for all slices of the same slice type in the picture.

The syntax element associating unit 230 is then configured to associate the RPL modification flag with the encoded representation, such as include it in a parameter set identifiable based on the encoded representation.

In an embodiment, the RPL modification flag setter 250 is configured to set the RPL modification flag if the RPL flag had the first value, i.e. all the slices of the picture that are of the same slice have identical final reference picture list(s).

Figure 4:
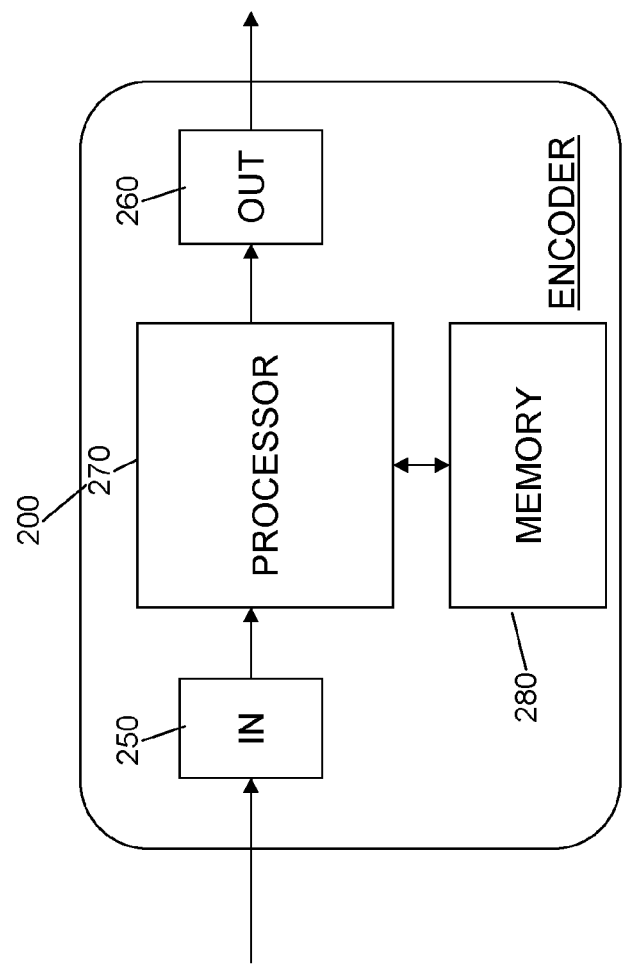
FIG. 4 is a schematic block diagram of an encoder according to an embodiment.

The encoder 200 of FIG. 15 with its including units 210-250 could be implemented in hardware. There are numerous variants of circuitry elements that can be used and combined to achieve the functions of the units 210-250 of the encoder 200. Such variants are encompassed by the embodiments. Particular examples of hardware implementation of the encoder 200 is implementation in DSP hardware and integrated circuit technology, including both general-purpose electronic circuitry and application-specific circuitry. The functionality of the encoder 200 can, alternatively, be implemented by means of a processor 270 and a memory 280 as illustrated in FIG. 4. The encoder 200 typically also comprises an input or input unit 250 configured to receive pictures of a video sequence to be encoded. An output or output unit 260 of the encoder 200 preferably outputs encoded representations of the pictures, such as in the form of encoded representation of the slices in the picture in the form of NAL units.

Figure 1:
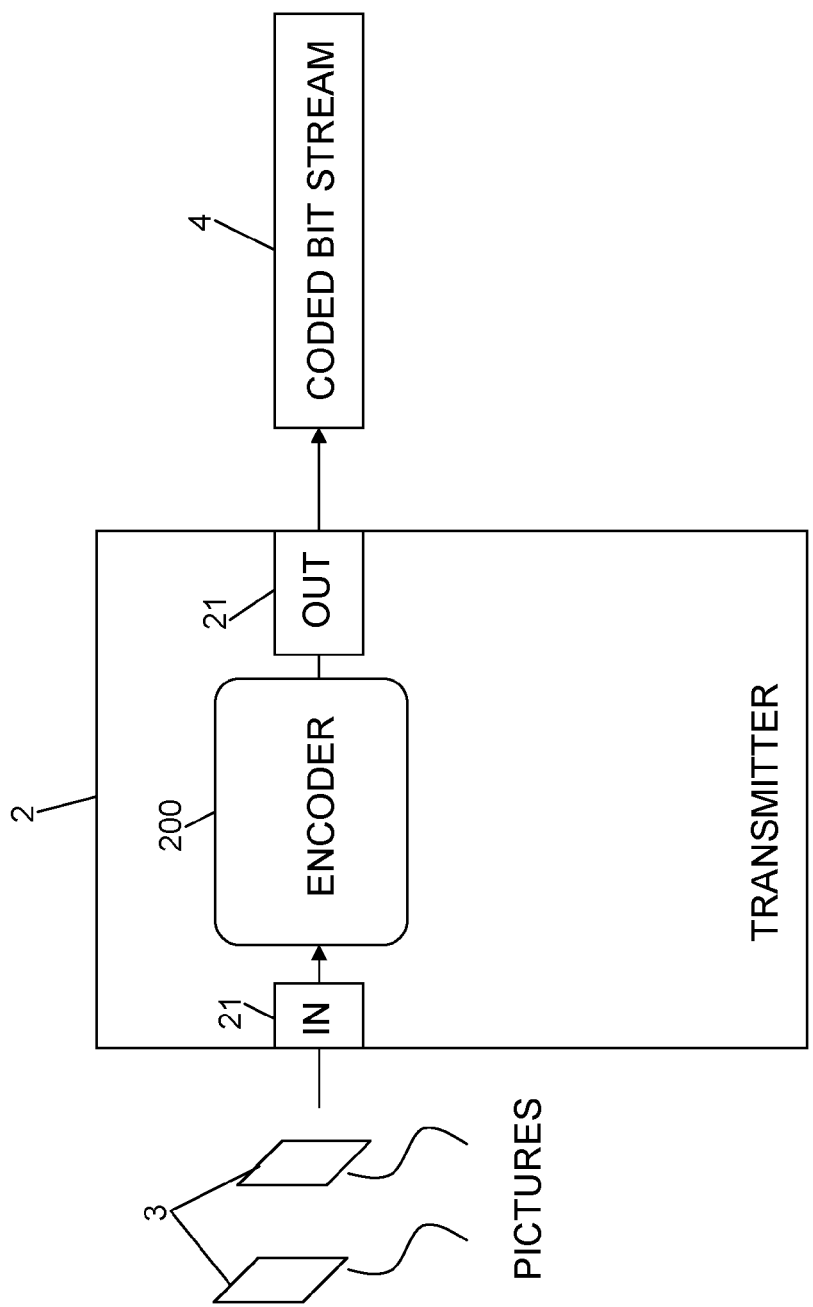
FIG. 1 is a schematic block diagram of a transmitter according to an embodiment.

The encoder 200 can be implemented in a device, such as a mobile device, exemplified as mobile phones, tablets, video camera, etc. FIG. 1 illustrates such a device exemplified by a general transmitter 2. The transmitter 2 typically comprises an input or input unit 21 configured to receive pictures 3 of a video sequence. An output or output unit 21 outputs encoded representations of the pictures in the form of a coded bit stream 4.

Thus, the encoder 200 at the transmitter 1 receives pictures 3 of a video sequence. The pictures 3 are coded into NAL units. In the encoder 200 the pictures 3 are divided into slices and slice elements are kept the same for all the slices in a picture. Information is transmitted indicative of one of more slice elements which are kept the same for all slices in the picture.

An aspect of the embodiments relates to a method of reference picture list handling in connection with decoding an encoded representation of a picture in a video sequence. The picture comprises at least one slice, preferably multiple slices. The method comprises providing, based on the encoded representation, information indicative of whether at least one slice element is kept the same for the at least one slice of the picture, preferably for the multiple slices of the picture and more preferably for all slices of a same slice type in the picture. This information is used to determine whether reference picture list construction can be performed once for the at least one slice of the picture, preferably for the multiple slices of the picture and more preferably for all slices of a same slice type in the picture.

A related another aspect of the embodiments defines a device for reference picture handling. The device comprises an information provider configured to provide, based on an encoded representation of a picture comprising at least one slice, preferably multiple slices, in a video sequence, information indicative of whether at least one slice element is kept the same for the at least one slice of the picture, preferably for the multiple slices of the picture and more preferably for all slices of a same slice type in the picture. A list construction determiner is configured to determine, based on the information provided by the information provider, whether reference picture list construction can be performed once for the at least one slice of the picture, preferably for the multiple slices of the picture and more preferably for all slices of a same slice type in the picture.

Other related aspects of the embodiments define a decoder comprising a device for reference picture list handling and a receiver comprising an input unit configured to receive an encoded representation of a picture of a video sequence. The picture comprises at least one slice, preferably multiple slices. The receiver further comprising a decoder according to the embodiments, a reference picture buffer configured to store reference pictures and an output unit configured to output a decoded picture.

Another aspect of the embodiments relates to a method of encoding a picture comprising at least one slice, preferably multiple slices, and is present in a video sequence. The method comprises determining whether at least one slice element, based on which reference picture list construction is to be performed, is to be kept the same for the at least one slice of the picture, preferably for the multiple slices of the picture and more preferably for all slices of a same slice type in the picture. An encoded representation of the picture is generated based on the at least one slice element. Information indicative of whether the at least one slice element is kept the same for the at least one slice of the picture, preferably for the multiple slices of the picture and more preferably for all slices of a same slice type in the picture, is associated with the encoded representation.

A related aspect of the embodiments defines an encoder for encoding a picture comprising at least one slice, preferably multiple slices, of a video sequence. The encoder comprises a slice element determiner configured to determine whether at least one slice element, based on which reference picture list construction is to be performed, is to be kept the same for the at least one slice of the picture, preferably for the multiple slices of the picture and more preferably for all slices of a same slice type in the picture. A representation generator is configured to generate an encoded representation of the picture based on the at least one slice element. The encoder also comprises an information provider configured to associate information indicative of whether the at least one slice element is kept the same for the at least one slice of the picture, preferably for the multiple slices of the picture and more preferably for all slices of a same slice type in the picture, with the encoded representation.

Another related aspect of the embodiments defines a transmitter comprising an input unit configured to receive a picture of a video sequence. The picture comprises at least one slice, preferably multiple slices. The transmitter also comprises an encoder according to the embodiments and an output unit configured to output an encoded representation of the picture.

The embodiments of these aspect thereby signal in the bitstream, i.e. coded data of the video sequence, that some, i.e. at least one, slice elements is kept the same for all slices of a picture. This in turn means that the decoder can use this signaled information to decide whether the computationally complex reference picture list construction could be performed only once for the slices of the picture and therefore do not need to be repeated for these slices.

Various implementation examples of these aspects will now be described.

In an implementation example, the slice elements comprise sequence syntax elements which are introduced to indicate that certain properties of each slice of a picture are kept the same for all slices in a picture. A non-exhaustive list of examples is presented here:

a) The number of reference pictures in L0 is the same for all slices in a picture. For HEVC, this can be constrained by a syntax element that indicates whether the value of the syntax element num_ref_idx_l0_active_minus1 is the same for all slices in a picture.

b) The number of reference pictures in L1 is the same for all slices in a picture. For HEVC, this can be constrained by a syntax element that indicates whether the value of the syntax element num_ref_idx_l1_active_minus1 is the same for all slices in a picture.

c) The initial quantization parameter is the same for all slices in the picture. For HEVC, this can be constrained by a syntax element that indicates whether the value of the syntax element slice_qp_delta is the same for all slices in a picture.

d) The deblocking filter parameters have the same values for all slices in the picture. For HEVC, this can be constrained by syntax elements that indicate whether the value of the syntax elements disable_deblocking_filter_flag and/or slice_alpha_c0_offset_div2 and/or slice_beta_offset_div2 is the same for all slices in a picture.

An embodiment of this example embodiment relates to a method of deblocking filter handling in connection with decoding an encoded representation of a picture in a video sequence, the picture comprises multiple slices, each comprising multiple blocks of pixels. The method comprises providing, based on the encoded representation, information indicative of whether at least one slice or syntax element representing or defining at least one deblocking filter parameter is kept the same for the multiple slices of the picture. The method also comprises determining, based on the information, whether the at least deblocking filter parameter will have a same value for the multiple slices in the picture.

In this embodiment the decoder can thereby determine, based on the information, whether deblocking filter construction can be performed once for the multiple slices of the picture. The at least one deblocking filter is employed in connection with decoding in order to combat block artefacts over block borders in the at least one slice. Hence, the parameters or at least a portion of the parameters of the at least one deblocking filter then only needs to be determined for a first slice of the picture and can then be reused for any remaining slice(s) of the picture.

A related embodiment of this example embodiment relates to a decoder configured to decode an encoded representation of a picture in a video sequence, the picture comprises multiple slices, each comprising multiple blocks of pixels. The decoder comprises an information provider configured to provide, based on the encoded representation, information indicative of whether at least one slice element representing or defining at least one deblocking filter parameter is kept the same for the multiple slices of the picture. The decoder also comprises a filter parameter determiner configured to determine, based on the information, whether the at least deblocking filter parameter will have a same value for the multiple slices in the picture.

Another embodiment of this example embodiment defines a method of encoding a picture of a video sequence, the picture comprises multiple slices, each comprising multiple blocks of pixels. The method comprises determining whether at least one slice element representing or defining at least one deblocking filter parameter is to be kept the same for the multiple slices of the picture. The method also comprises generating an encoded representation of the picture based on the at least one slice element. The method further comprises associating information indicative of whether the at least one slice element is kept the same for the multiple slices of the picture with the encoded representation.

Another related embodiment of this example embodiment defines an encoder configured to encode a picture of a video sequence, the picture comprises multiple slices, each comprising multiple blocks of pixels. The encoder comprises a slice element determiner configured to determine whether at least one slice element representing or defining at least one deblocking filter parameter is to be kept the same for the multiple slices of the picture. The encoder also comprises a representation generator configured to generate an encoded representation of the picture based on the at least one slice element. The encoder further comprises an information provider configured to associate information indicative of whether the at least one slice element is kept the same for the multiple slices of the picture with the encoded representation.

e) The weighted prediction parameters or weights for weighted prediction have the same value for all slices in the picture.

An embodiment of this example embodiment relates to a method of weighted prediction handling in connection with decoding an encoded representation of a picture in a video sequence, the picture comprises multiple slices. The method comprises providing, based on the encoded representation, information indicative of whether at least one slice or syntax element representing or defining at least one weighted prediction parameter or at least one weight for weighted prediction is kept the same for the multiple slices of the picture. The method also comprises determining, based on the information, whether the at least weighed prediction filter parameter or the at least one weight will have a same value for the multiple slices in the picture.

In this embodiment the decoder can thereby determine, based on the information, whether prediction weight construction can be performed once for the multiple slices of the picture. The at least one weighted prediction parameter or weight is employed in connection with decoding in order to define the prediction weights for the reference picture(s) based on which a slice of the picture is decoded. Hence, the weighted prediction parameter(s) or the weight(s) then only need(s) to be determined for a first slice of the picture and can then be reused for any remaining slice(s) of the picture.

A related embodiment of this example embodiment relates to a decoder configured to decode an encoded representation of a picture in a video sequence, the picture comprises multiple slices. The decoder comprises an information provider configured to provide, based on the encoded representation, information indicative of whether at least one slice element representing or defining at least one weighted prediction parameter at least one weight for weighted prediction is kept the same for the multiple slices of the picture. The decoder also comprises a weight determiner configured to determine, based on the information, whether the at least one weighted prediction parameter or the at least one weight will have a same value for the multiple slices in the picture.

Another embodiment of this example embodiment defines a method of encoding a picture of a video sequence, the picture comprises multiple slices. The method comprises determining whether at least one slice element representing or defining at least one weighted prediction parameter or at least one weight for weighted prediction is to be kept the same for the multiple slices of the picture. The method also comprises generating an encoded representation of the picture based on the at least one slice element. The method further comprises associating information indicative of whether the at least one slice element is kept the same for the multiple slices of the picture with the encoded representation.

Another related embodiment of this example embodiment defines an encoder configured to encode a picture of a video sequence, the picture comprises multiple slices. The encoder comprises a slice element determiner configured to determine whether at least one slice element representing or defining at least one weighted prediction parameter or at least one weight for weighted prediction is to be kept the same for the multiple slices of the picture. The encoder also comprises a representation generator configured to generate an encoded representation of the picture based on the at least one slice element. The encoder further comprises an information provider configured to associate information indicative of whether the at least one slice element is kept the same for the multiple slices of the picture with the encoded representation.

f) The arithmetic coder initialization parameters are the same for all slices in the picture. For HEVC, this can be constrained by a syntax element that indicates whether the value of the syntax element cabac_init_idc is the same for all slices in a picture.

As a possible alternative, instead of indicating whether a certain slice property is the same for all slices in a picture, the sequence syntax elements can indicate whether all slices of the same slice type that belong to the same picture have the same property. This alternative can be mixed such that for some slice properties, the property must be the same for all slices in a picture, but for other slice properties, the property must be the same for all slices of the same slice type in a picture.

One possibility is to bundle slice properties such that a single sequence syntax element indicates that several slice properties are the same for slices that belong to the same picture. This can also be combined with the mix described above such that some properties in the bundle must be the same for all slices in a picture, but for other slice properties in the bundle, the property must be the same for all slices of the same slice type in a picture.

The sequence syntax elements could for HEVC for example be present in the SPS.

In another example embodiment the slice element comprises a codeword in the bitstream that signals the number of different final reference picture lists (after the modification of the initial reference picture list) there may be at most for a picture in the bitstream.

The signal is preferably signaled once per sequence (in the SPS for HEVC) but can optionally be signaled once for a set of pictures (PPS or APS for HEVC).

The codeword may use universal variable length code (UVLC) coding (exponential Golomb coding with k=0) with the following representation:

| | |
|---|---|
| 1 | Same final reference picture lists for all slices in any picture |
| 010 | Maximum 2 different reference picture lists in any picture in the video sequence |
| 011 | Max 3 different reference picture lists in any picture in the video sequence |
| 00100 | Max 4 different reference picture lists in any picture in the video sequence |
| etc | |

Alternatively, one short codeword, e.g. '1', may be used to signal that there is no limit set on the number of different reference picture lists in the bitstream. The meaning of the other codewords can be shifted accordingly to give e.g. the following representation:

| | |
|---|---|
| 1 | No restriction |
| 010 | Same final reference picture lists for all slices in any picture |
| 011 | Maximum 2 different reference picture lists in any picture in the video sequence |
| 00100 | Max 3 different reference picture lists in any picture in the video sequence |
| 00101 | Max 4 different reference lists in any picture in the video sequence |
| etc | |

Note that the codewords given above are examples, other codewords may be used for signaling the number of different lists used at most for a picture.

This will reduce the decoding complexity since the decoder does not have to perform reference picture list construction for every slice. The decoder can perform reference picture list construction for the first slice in the picture and then keep that reference picture list(s) for the rest of the slices in the picture. Without this information, the decoder will not know whether an encoder uses the same final reference picture list in every slice. The decoder then has to be prepared for different reference picture lists for every slice and be designed to handle the worst-case complexity case. Note that for error resilience purposes, the list construction syntax may preferably still be repeated in every slice.

In a further example embodiment, a flag is used instead of the codeword described in the another example embodiment. The flag signals whether any picture uses more than one final reference picture list or not. One flag state means that every slice of the same picture uses the same reference picture list(s) as the other slices of that same picture. If this state is signaled, a decoder only needs to perform reference picture list construction for the first slice it receives for a picture, it will know that the same reference picture list(s) will be used for all other slices in the picture. This will reduce the decoding complexity since the decoder does not have to perform reference picture list construction for every slice. The decoder can perform reference picture list construction for the first slice in the picture and then keep that reference picture list(s) for the rest of the slices in the picture. Without this flag and this flag state, the decoder will not know whether an encoder uses the same final reference picture list(s) in every slice. The decoder then has to be prepared for different reference picture lists for every slice and be designed to handle the worst-case complexity case. Note that for error resilience purposes, the list construction syntax may preferably still be repeated in every slice.

In still another example embodiment, any of the previous signaling methods is tied to a profile. Hence the slice elements comprise a profile. Profiles are signaled in the bitstream. For HEVC, the profile is signaled using the profile_idc syntax element in the SPS. In a preferred example, a profile requires that some slice properties are the same for each slice (either with the same slice type or every slice regardless of slice type) that belong to the same picture.

In yet another example embodiment, the slice elements are sent in a parameter set. For instance the list construction and modification syntax is moved from the slice header to a parameter set that contains syntax for one entire picture regardless of the number of slices used for a picture. The advantage is bit savings; signaling the list modification syntax once per picture instead of repeating it in every slice reduces the overall bit cost. An example of such a parameter set is the APS in HEVC. In a preferred example, the mode as described in any example embodiment above is signaled, for instance, in the SPS or the PPS. If the mode indicates that the same modification is used in all slices of the same picture, the modification syntax is present in the APS and not in the slice header. If the mode indicates that there is no modification there is no modification syntax present in neither the APS nor the slice header. If the mode indicates that there are at least two slices with different reference picture lists, the modification syntax is present in the slice header. Another alternative is that when the mode indicates that there are at least two slices with different reference picture lists, the modification syntax is present in the APS.

Hence, according an aspect a method is provided, wherein one or more slice elements are kept the same for all slices in a picture and information is transmitted indicative of one or more slice elements which are kept the same for all slices in a picture. According to an aspect a method is provided, wherein information is received indicator of one or more slice elements which are kept the same for all slices in a picture.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A method of reference picture list handling in connection with decoding an encoded representation of a picture in a video sequence, said picture comprises multiple slices, said method comprising:
   providing a mode signaling syntax element based on said encoded representation; and
   determining, based on said mode signaling syntax element, whether at least one final reference picture list is the same for all slices of a same slice type in said picture, wherein
   providing said mode signaling syntax element comprises providing a reference picture list flag based on said encoded representation, and
   determining whether said at least one final reference picture list is the same comprises determining that said at least one final reference picture list is the same for all slices of said same slice type in said picture if said reference picture list flag has a first value and determining that said at least one final reference picture list does not need to be the same for all slices of said same slice type in said picture if said reference picture list flag has a second value different than the first value.

2. The method according to claim 1, wherein determining whether said at least one final reference picture list is the same comprises determining, based on said mode signaling syntax element, whether a first final reference picture list is the same for all P slices in said picture and whether the first final reference picture list and a second final reference picture list are the same for all B slices in said picture.

3. The method according to claim 1, wherein determining whether said at least one final reference picture list is the same comprises determining, based on said mode signaling syntax element, whether a final reference picture list L0 is the same for all P slices and all B slices in said picture and a final reference picture list L1 is the same for all B slices in said picture.

4. The method according to claim 1, wherein determining whether said at least one final reference picture list is the same comprises determining, based on said mode signaling syntax element, whether i) said final reference picture list is the same for all slices of said same slice type in said picture or ii) a number of different reference picture lists used in said picture is unrestricted.

5. The method according to claim 1, further comprising determining, based on said mode signaling syntax element, whether any reference picture list modification is applied to at least one initial reference picture list to form said at least one final reference picture list.

6. A device for reference picture list handling comprising:
   a syntax element provider configured to provide a mode signaling syntax element based on an encoded representation of a picture in a video sequence, said picture comprising multiple slices; and
   a list determiner configured to determine, based on said mode signaling syntax element, whether at least one final reference picture list is the same for all slices of a same slice type in said picture, wherein
   said syntax element provider is configured to provide said mode signaling syntax element by providing a reference picture list flag based on said encoded representation, and
   said list determiner is configured to determine that said at least one final reference picture list is the same for all slices of said same slice type in said picture based on when said reference picture list flag has a first value and determine that said at least one final reference picture list does not need to be the same for all slices of said same slice type in said picture based on when said reference picture list flag has a second value different than the first value.

7. The device according to claim 6, wherein said list determiner is configured to determine, based on said mode signaling syntax element, whether a first final reference picture list is the same for all P slices in said picture and whether the first final reference picture list and a final reference picture list are the same for all B slices in said picture.

8. The device according to claim 6, wherein said list determiner is configured to determine, based on said mode signaling syntax element, whether a final reference picture list L0 is the same for all P slices and all B slices in said picture and a final reference picture list L1 is the same for all B slices in said picture.

9. The device according to claim 6, wherein said list determiner is configured to determine, based on said mode signaling syntax element, whether i) said at least one final reference picture list is the same for all slices of said same slice type in said picture or ii) a number of different reference picture lists used in said picture is unrestricted.

10. The device according to claim 6, further comprising a list modification determiner configured to determine, based on said mode signaling syntax element, whether reference picture list modification is applied to at least one initial reference picture list to form said at least one final reference picture list.

11. A decoder comprising a device for reference picture list handling according to claim 6.

12. A receiver comprising:
   an input unit configured receive an encoded representation of a picture of a video sequence, said picture comprising multiple slices;
   a decoder according to claim 11;
   a reference picture buffer configured to store reference pictures defined in a final reference picture list or lists; and
   an output unit configured to output a decoded picture.

13. A method of encoding a picture of a video sequence, said picture comprising multiple slices, said method comprising:
- determining whether at least one final reference picture list is the same for all slices of a same slice type in said picture;
- generating an encoded representation of said picture; and
- associating, with said encoded representation, a mode signaling syntax element indicative of whether said at least one final reference picture list is the same for all slices of said same slice type in said picture, further comprising setting a reference picture list flag to a first value if said at least one final reference picture list is the same for all slices of said same slice type in said picture, wherein associating said mode signaling syntax element comprises associating said reference picture list flag with said encoded representation.

14. The method according to claim 13, further comprising setting a reference picture list flag to a second value if said at least one final reference picture list does not need to be the same for all slices of said same slice type in said picture, wherein associating said mode signaling syntax element comprises associating said reference picture list flag with said encoded representation.

15. An encoder for encoding a picture of a video sequence, said picture comprising multiple slices, said encoder comprising:
- a list determiner configured to determine whether at least one final reference picture list is the same for all slices of a same slice type in said picture;
- a representation generator configured to generate an encoded representation of said picture; and
- a syntax element associating unit configured to associate, with said encoded representation, a mode signaling syntax element indicative of whether said at least one final reference picture list is the same for all slices of said same slice type in said picture, further comprising a reference picture list flag setter configured to set a reference picture list flag to a first value if said at least one final reference picture list is the same for all slices of said same slice type in said picture, wherein said syntax element associating unit is configured to associate said reference picture list flag with said encoded representation.

16. The encoder according to claim 15, further comprising a reference picture list flag setter configured to set a reference picture list flag to a second value if said at least one final reference picture list does not need to be the same for all slices of said same slice type in said picture, wherein said syntax element associating unit is configured to associate said reference picture list flag with said encoded representation.

17. A transmitter comprising:
- an input unit configured receive a picture of a video sequence, said picture comprising multiple slices;
- an encoder according to claim 15; and
- an output unit configured to output an encoded representation of said picture.

* * * * *

UNITED STATES PATENT AND TRADEMARK OFFICE
CERTIFICATE OF CORRECTION

PATENT NO. : 9,565,434 B2
APPLICATION NO. : 14/372704
DATED : February 7, 2017
INVENTOR(S) : Sjöberg et al.

It is certified that error appears in the above-identified patent and that said Letters Patent is hereby corrected as shown below:

On the Title Page

Item (56), under "U.S. PATENT DOCUMENTS", in Column 2, Line 1, delete "Jeon" and insert -- Jeon et al. --, therefor.

Item (56), under "U.S. PATENT DOCUMENTS", in Column 2, Line 3, delete "Chen" and insert -- Chen et al. --, therefor.

On Page 2, item (56), under "OTHER PUBLICATIONS", in Column 1, Line 7, delete "San Josa" and insert -- San Jose --, therefor.

In the Specification

In Column 1, Line 29, delete "Team-Video" and insert -- Team on Video --, therefor.

In Column 1, Line 32, delete "Strandardization" and insert -- Standardization --, therefor.

In Column 5, Line 18, delete "bistream" and insert -- bitstream --, therefor.

In Column 11, Lines 18-22, delete "However,....................picture." and insert the same at Line 17, after "picture." as a continuation paragraph.

In Column 11, Line 24, delete "i.e. an" and insert -- i.e. a --, therefor.

In Column 12, Lines 53-54, delete "num_ref idx_l0_active_minus1" and insert -- num_ref_idx_l0_active_minus1 --, therefor.

In Column 13, Line 4, delete "num_ref idx_l1_active_minus1" and insert -- num_ref_idx_l1_active_minus1 --, therefor.

Signed and Sealed this
Twelfth Day of June, 2018

Andrei Iancu
*Director of the United States Patent and Trademark Office*

In Column 13, Lines 14-15, delete "num_ref idx_l0_active_minus1 and num_ref idx_l1_active_minus1" and insert -- num_ref_idx_l0_active_minus1 and num_ref_idx_l1_active_minus1 --, therefor.

In Column 13, Line 36, delete "could used" and insert -- could be used --, therefor.

In Column 15, Lines 54-55, delete "Alternatively" and insert -- Alternatively, --, therefor.

In Column 19, Lines 17-18, delete "num_ref idx_l0 active_minus1 and num_ref idx_l1_active_minus1" and insert -- num_ref_idx_l0_active_minus1 and num_ref_idx_l1_active_minus1 --, therefor.

In Column 19, Line 64, delete "lists" and insert -- lists. --, therefor.

In Column 21, Line 26, delete "Alternatively" and insert -- Alternatively, --, therefor.

In Column 22, Lines 18-19, "num_ref idx_l0 active_minus1 and num_ref idx_l1_active_minus1" and insert -- num_ref_idx_l0_active_minus1 and num_ref_idx_l1_active_minus1 --, therefor.

In Column 22, Line 52, delete "num_ref idx_l0_active_minus1+1." and insert -- num_ref_idx_l0_active_minus1+1. --, therefor.

In Column 22, Line 62, delete "num_ref idx_l1_active_minus1+1." and insert -- num_ref_idx_l1_active_minus1+1. --, therefor.

In Column 23, Line 18, delete "like" and insert -- like: --, therefor.

In Column 23, Line 33, delete "my be" and insert -- may be --, therefor.

In Column 23, Lines 36-37, delete "num_ref idx_active_override_flag, num_ref idx_l0_active_minus1 and num_ref idx_l1_active_minus1" and insert -- num_ref_idx_active_override_flag, num_ref_idx_l0_active_minus1 and num_ref_idx_l1_active_minus1 --, therefor.

In Column 23, Line 42, delete "list_modificationpresent_flag" and insert -- list_modification_present_flag --, therefor.

In Column 23, Line 44, delete "list_modificationpresent_flag" and insert -- list_modification_present_flag --, therefor.

In Column 24, Line 5, delete "if( vui_paraemters_present_flag )" and insert -- if( vui_parameters_present_flag ) --, therefor.

In Column 24, Lines 37-50, delete

```
slice_header( ) {                                    Descriptor
   ...
   if( slice_type == P || slice_type ==B ) {
      num_ref_idx_active_override_flag              u(1)
      if( num_ref_idx_active_override_flag ) {
         num_ref_idx10_active_minus1
         if( slice_type == B )
            num_ref_idx11_active_minus1
      }
   ...
   if( lists_modification_present_flag )
      ref_pic_lists_modification( )
   ...
   }
``` and insert --

```
slice_header( ) {                                    Descriptor
   ...
   if( slice_type == P || slice_type ==B ) {
      num_ref_idx_active_override_flag              u(1)
      if( num_ref_idx_active_override_flag ) {
         num_ref_idx10_active_minus1
         if( slice_type == B )
            num_ref_idx11_active_minus1
      }
   ...
   if( lists_modification_present_flag )
      ref_pic_lists_modification( )
   ...
   }
}
```

--, therefor.

In Column 24, Line 64, delete "]" and insert -- } --, therefor.

In Column 25, Lines 5-8, delete "ref idx_active_override_flag, num_ref idx_l0_active_minus1, num_ref idx_l1_active_minus1, ref_pic_list_combination_flag and num_ref idx_lc_active_minus1" and insert -- ref_idx_active_override_flag, num_ref_idx_l0_active_minus1, num_ref_idx_l1_active_minus1, ref_pic_list_combination_flag and num_ref_idx_lc_active_minus1 --, therefor.

In Column 26, Line 47, delete "a r RPL" and insert -- a RPL --, therefor.

In Column 30, Line 66, delete "num_ref idx_l0_active_minus1" and insert -- num_ref_idx_l0_active_minus1 --, therefor.

In Column 31, Line 4, delete "num_ref idx_l1_active_minus1" and insert -- num_ref_idx_l1_active_minus1 --, therefor.

In Column 33, Line 36, delete "example" and insert -- example, --, therefor.

In Column 33, Line 45, delete "code" and insert -- codeword --, therefor.

CERTIFICATE OF CORRECTION (continued)
U.S. Pat. No. 9,565,434 B2

In the Claims

In Column 36, Line 60, in Claim 12, delete "configured receive" and insert -- configured to receive --, therefor.

In Column 38, Line 25, in Claim 17, delete "configured receive" and insert -- configured to receive --, therefor.